(12) United States Patent
Sakai et al.

(10) Patent No.: US 9,171,199 B2
(45) Date of Patent: Oct. 27, 2015

(54) INFORMATION PROCESSING DEVICE AND INFORMATION PROCESSING METHOD

(75) Inventors: Yusuke Sakai, Kanagawa (JP); Masao Kondo, Tokyo (JP)

(73) Assignee: Sony Corporation (JP)

( * ) Notice: Subject to any disclaimer, the term of this patent is extended or adjusted under 35 U.S.C. 154(b) by 118 days.

(21) Appl. No.: 13/876,580

(22) PCT Filed: Sep. 30, 2011

(86) PCT No.: PCT/JP2011/005535
§ 371 (c)(1),
(2), (4) Date: Mar. 28, 2013

(87) PCT Pub. No.: WO2012/046425
PCT Pub. Date: Apr. 12, 2012

(65) Prior Publication Data
US 2013/0182914 A1 Jul. 18, 2013

(30) Foreign Application Priority Data

Oct. 7, 2010 (JP) ................................. 2010-227868

(51) Int. Cl.
*G06K 9/00* (2006.01)
*H04N 7/14* (2006.01)
*H04N 7/15* (2006.01)
(Continued)

(52) U.S. Cl.
CPC ............ *G06K 9/00288* (2013.01); *H04N 7/141* (2013.01); *H04N 7/15* (2013.01); *H04N 21/4223* (2013.01); *H04N 21/441* (2013.01); *H04N 21/44218* (2013.01); *H04N 21/4788* (2013.01); *H04N 21/6582* (2013.01)

(58) Field of Classification Search
CPC .................. G06T 2207/10016; G06T 7/0083; G06T 7/0081; G06K 9/4609; G06K 9/6203; G06K 9/00664; G07C 9/00158
USPC .......................... 382/115, 190, 103, 217, 224
See application file for complete search history.

(56) References Cited

U.S. PATENT DOCUMENTS 8,325,214 B2* 12/2012 Hildreth ...................... 348/14.03
2004/0233180 A1 11/2004 Hiroi et al.
(Continued)

FOREIGN PATENT DOCUMENTS

CN  1737732 A  2/2006
JP  2000184346 A  6/2000
(Continued)

OTHER PUBLICATIONS

International Search Report for Application No. PCT/JP2011/005535, dated Oct. 25, 2011.
(Continued)

*Primary Examiner* — Ruiping Li
(74) *Attorney, Agent, or Firm* — Lerner, David, Littenberg, Krumholz & Mentlik, LLP

(57) ABSTRACT

An information processing apparatus may include a user recognition unit to recognize a user in a captured image, and a behavior recognition unit to recognize a behavior of a user. In addition, the apparatus may include a generation unit to generate user behavior information including information of the recognized user and the recognized behavior of the recognized user. Further, the apparatus may include a communication unit to transmit the user behavior information to an external apparatus.

17 Claims, 17 Drawing Sheets

(51) Int. Cl.
*H04N 21/4223* (2011.01)
*H04N 21/441* (2011.01)
*H04N 21/442* (2011.01)
*H04N 21/4788* (2011.01)
*H04N 21/658* (2011.01)

(56) References Cited

U.S. PATENT DOCUMENTS

2006/0023949 A1* 2/2006 Saito et al. .................... 382/217
2008/0298571 A1 12/2008 Kurtz et al.
2010/0153497 A1 6/2010 Sylvain et al.
2010/0250252 A1 9/2010 Yasoshima

FOREIGN PATENT DOCUMENTS

| | | |
|---|---|---|
| JP | 2005020647 A | 1/2005 |
| JP | 2005092657 A | 4/2005 |
| JP | 2006-050370 A | 2/2006 |
| JP | 2006139614 A | 6/2006 |
| JP | 2006185393 A | 7/2006 |
| JP | 2008085493 A | 4/2008 |
| JP | 2008125025 A | 5/2008 |
| JP | 2008252166 A | 10/2008 |
| JP | 2010213133 A | 9/2010 |
| WO | 2009042579 A1 | 4/2009 |

OTHER PUBLICATIONS

Extended European Search Report for EP Application No. 11830359.3, dated Jul. 10, 2015.
Japanese Office Action for JP Application No. 2014131108, dated Jul. 14, 2015.
Chinese Office Action for CN Application No. 201180047271.7, dated Jul. 3, 2015.

* cited by examiner

USER C    USER D

USER B    USER A

INFORMATION PROCESSING DEVICE AND INFORMATION PROCESSING METHOD

CROSS-REFERENCE TO RELATED APPLICATION

The present application is a national phase entry under 35 U.S.C. §371 of International Application No. PCT/JP2011/005535filed Sep. 30, 2011, published on Apr. 12, 2012 as WO 2012/046425 A1, which claims priority from Japanese Patent Application No. JP 2010-227868 filed in the Japanese Patent Office on Oct. 7, 2010.

TECHNICAL FIELD

The present disclosure relates to an information processing device and an information processing method.

BACKGROUND ART

Telephones, so-called videophones, video conferencing systems and the like are used as devices for interaction between users at remote locations. Further, a method of performing text chat or video chat with video and speech through Internet connection using personal computers and the like is also used.

In such a background, devices such as electronic equipment are becoming more sophisticated and multifunctional, and, a television receiver, for example, has a network communication function so that it can not only receive and display video and speech contents of a program from a broadcasting station but also exchange various kinds of information with another receiver.

For example, JP 2006-50370A discloses a technique that, when a user views a program content of television broadcasting with a television receiver, displays information related to other users registered (e.g., videos of other users, thumbnail images of other users, names, channels or videos of contents viewed by other users etc.) concurrently with the program content.

CITATION LIST

Patent Literature

PTL 1: JP 2006-50370A

SUMMARY

Technical Problem

In the technique disclosed in JP 2006-50370A described above, the television receiver receives a video or speech from the other receiver(s) in one location or a plurality of locations and plays the received video or speech concurrently with the display of the program content, for example, to thereby enable the user to share the same program content and communicate face to face with a user at a remote location.

However, in the case where there are a plurality of users of the other receiver in one location, when any one of the plurality of users of the other receiver performs some act of behavior such as speech, for example, it is difficult for a user of the television receiver to be aware of which user of the plurality of users of the other receiver has performed the behavior from the playback of the video or speech received from the other receiver.

In light of the foregoing, it is desirable to provide novel and improved information processing device and information processing method that enable a user to be aware of which user of another information processing device has performed a behavior.

Solution to Problem

In accordance with one embodiment, an information processing apparatus may include a user recognition unit to recognize a user in a captured image, and a behavior recognition unit to recognize a behavior of a user. In addition, the apparatus may include a generation unit to generate user behavior information including information of the recognized user and the recognized behavior of the recognized user, and a communication unit to transmit the user behavior information to an external apparatus.

In accordance with another embodiment, an information processing apparatus may include a communication unit to receive from an external apparatus user behavior information including information of a recognized user and a recognized behavior of the recognized user, and a generation unit to control display on a display screen of an image including a user image corresponding to the information of the recognized user and a visual representation corresponding to the information of the recognized behavior.

In accordance with another embodiment, a method of information processing may include recognizing a user in a captured image and recognizing a behavior of a user. Further, the method may include generating, by a processor, user behavior information including information of the recognized user and the recognized behavior of the recognized user, and transmitting the user behavior information to an external apparatus.

In accordance with another embodiment, a method of information processing may include receiving from an external apparatus user behavior information including information of a recognized user and a recognized behavior of the recognized user, and controlling, by a processor, display on a display screen of an image including a user image corresponding to the information of the recognized user and a visual representation corresponding to the information of the recognized behavior.

In accordance with another embodiment, a non-transitory recording medium may be recorded with a computer-readable program executable by a computer. The program may include recognizing a user in a captured image and recognizing a behavior of a user. The program may further include generating user behavior information including information of the recognized user and the recognized behavior of the recognized user, and transmitting the user behavior information to an external apparatus.

In accordance with another embodiment, a non-transitory recording medium may be recorded with a computer-readable program executable by a computer. The program may include receiving from an external apparatus user behavior information including information of a recognized user and a recognized behavior of the recognized user, and controlling display on a display screen of an image including a user image corresponding to the information of the recognized user and a visual representation corresponding to the information of the recognized behavior.

Advantageous Effects of Invention

As described above, the present disclosure enables a user to be aware of which user of another information processing device has performed a behavior.

BRIEF DESCRIPTION OF DRAWINGS

FIG. 6A to FIG. 6D are explanatory views illustrating an example 1 of the disclosure. FIG. 7A to FIG. 7D are explanatory views illustrating the example 1 of the disclosure. FIG. 8A to FIG. 8D are explanatory views illustrating an example 2 of the disclosure. FIG. 9A to FIG. 9D are explanatory views illustrating an example 3 of the disclosure. FIG. 10A to FIG. 10B are explanatory views illustrating an example 4 of the disclosure. FIG. 11A to FIG. 11E are explanatory views illustrating an example 5 of the disclosure. FIG. 12A to FIG. 12B are explanatory views illustrating an example 6 of the disclosure. FIG. 13A to FIG. 13L are explanatory views illustrating an example 7 of the disclosure.

DESCRIPTION OF EMBODIMENTS

Figure 1:
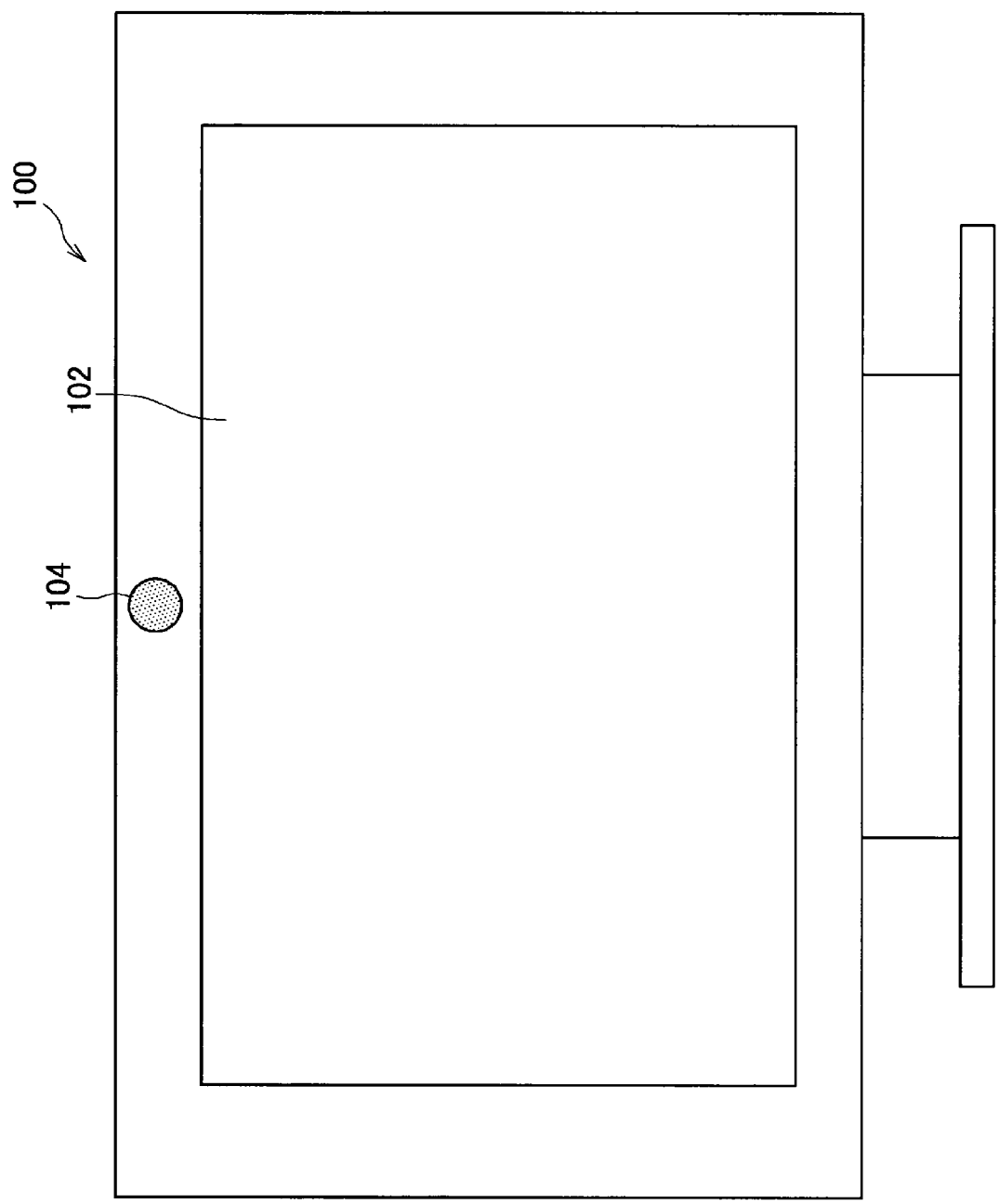
FIG. 1 is an explanatory view illustrating an example of a display system according to an embodiment of the disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be provided in the following order.
1. Display System
2. Functional Configuration of Information Processing Device (First Embodiment)
3. Hardware Configuration of Information Processing Device
4. Display Process
5. Examples
6. Functional Configuration of Information Processing Device (Second Embodiment)

(1. Display System)

A display system according to an embodiment of the disclosure is described firstly. FIG. 1 is an explanatory view illustrating an example of a display system according to the embodiment. FIG. 1 is a front view where the display system is viewed from the front.

In FIG. 1, a display system 100 includes a display device 102 and an imaging device 104, for example.

The display device 102 can display still images or moving images based on drive signals. For example, the display device 102 displays still images or moving images by liquid crystals. Note that the display device 102 may display still images or moving images using a self-luminous display device such as an organic EL (Electro-Luminescence).

The imaging device 104 is placed at the center of the upper part of the display device 102, and it can capture a subject image in the display direction of the display device 102. The imaging device 104 may capture a still image or a moving image using a CCD (Charge Coupled Device) image sensor or using a CMOS (Complementary Metal Oxide Semiconductor) image sensor.

Note that, although the imaging device 104 is mounted at the center of the upper part of the display device 102 in this embodiment, the place where the imaging device 104 is mounted is not limited to the center of the upper part of the display device 102. For example, the imaging device 104 may be mounted at the center of the lower part of the display device 102. Further, although one imaging device 104 is mounted in this embodiment, the number of imaging devices 104 is not limited to one. For example, two or more imaging devices 104 may be mounted. Furthermore, although the display device 102 and the imaging device 104 are integrated in a single piece in this embodiment, the display device 102 and the imaging device 104 may be separated into different pieces.

Note that, in the display system 100, a sensor (not shown) that detects the presence or absence of a user in front of the display device 102, a signal receiving unit (not shown) that is capable of receiving a control signal by infrared ray or radio wave from a remote controller (not shown) may be mounted. The control signal is an example of an operation signal of the disclosure. Further, the sensor may be capable of detecting the distance between the display device 102 and a user in front of the display device 102. Furthermore, a sound acquisition means that is capable of acquiring the surrounding sound, such as a microphone, for example, may be mounted in the display system 100.

The display device 102 according to the embodiment can display contents of still images or moving images, and display images generated by an information processing device 200 in a display process of FIG. 4, as described later.

Figure 2:
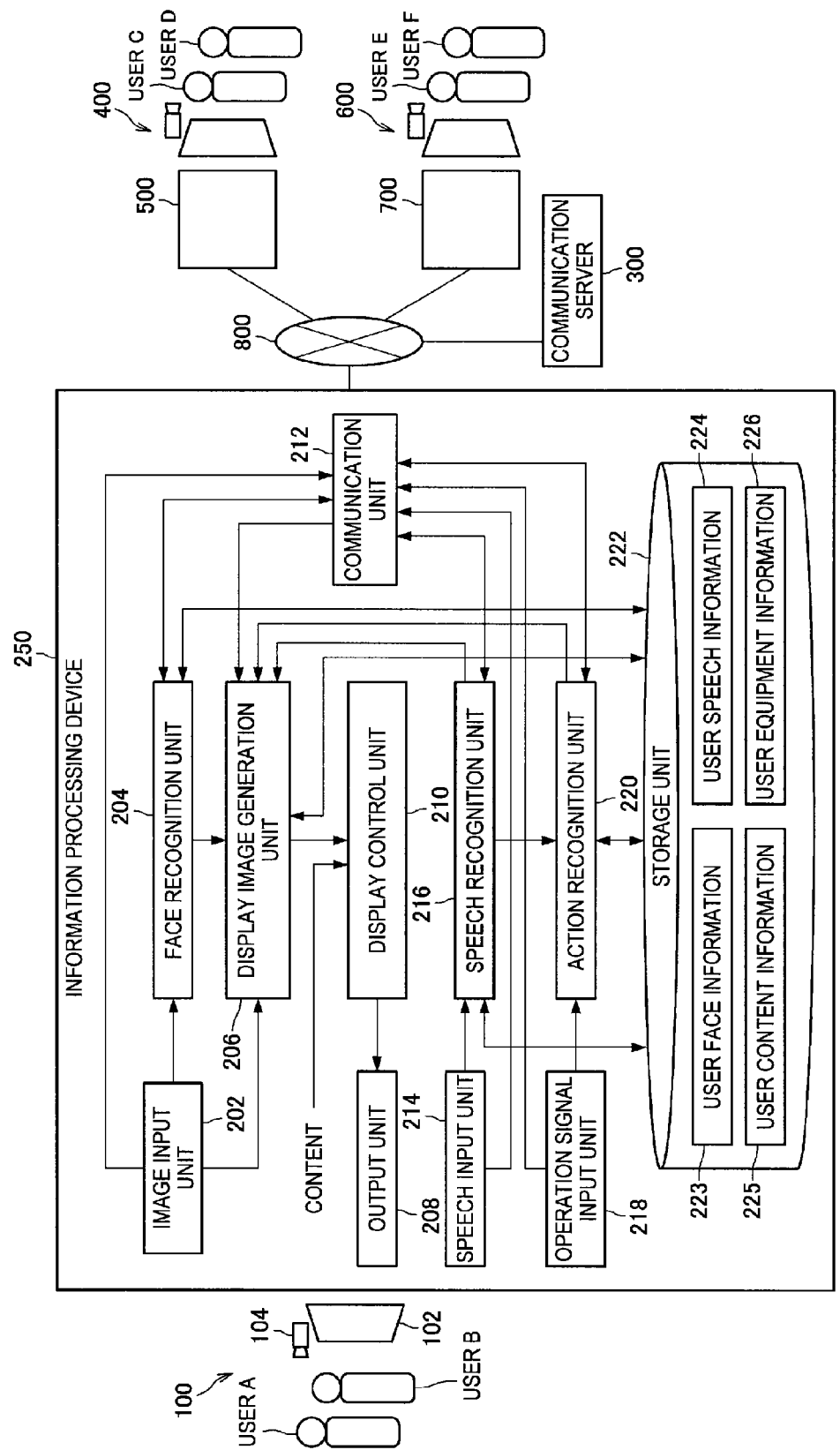
FIG. 2 is an explanatory view illustrating an example of a functional configuration of an information processing device according to a first embodiment of the disclosure.

Further, the imaging device 104 according to the embodiment can capture still images or moving images of users A and B looking at the display screen of the display device 102 in FIG. 2.

(2. Functional Configuration of Information Processing Device (First Embodiment))

Next, a functional configuration of an information processing device according to a first embodiment of the disclosure is described. FIG. 2 is an explanatory view illustrating an example of a functional configuration of an information processing device according to the embodiment. Note that FIG. 2 shows the display system 100 that transmits a captured image to the information processing device 200, which is an information processing device according to the embodiment, and receives a signal for driving the display device 102 from the information processing device 200, and users A and B, which are users of the display system 100 and the information processing device 200. FIG. 2 further shows a communication network 800 to which the information processing device 200 can connect, a communication server 300 and other information processing devices 500 and 700 that can connect to the communication network 800, another display system 400 that transmits a captured image to the information processing device 500 and receives a signal from the information processing device 500, users C and D, which are users of the display system 400 and the information processing device 500, another display system 600 that transmits a captured image to the information processing device 700 and receives a signal from the information processing device 700, and users E and F, which are users of the display system 600 and the information processing device 700. The other display systems 400 and 600 have the same configuration as the display system 100, and detailed explanation thereof is omitted. Further, the other information processing devices 500 and 700 have the same configuration as the information processing device 200, and detailed explanation thereof is omitted. The other information processing devices 500 and 700 are examples of a communication target device in the disclosure.

In FIG. 2, the information processing device 200 includes an image input unit 202, a face recognition unit 204, a display image generation unit 206, an output unit 208, a display control unit 210, a communication unit 212, a speech input unit 214, a speech recognition unit 216, an operation signal input unit 218, an action recognition unit 220, and a storage unit 222, for example.

The image input unit 202, which is an example of an input unit in the disclosure, receives a captured image generated by imaging in the imaging device 104. Then, the image input unit 202 transmits the received (input) captured image to the communication unit 212. Note that the image input unit 202 may transmit the received captured image to the face recognition unit 204 or the display image generation unit 206.

The face recognition unit 204, which is an example of a recognition unit in the disclosure, receives a captured image from the other information processing device 500, 700 which is received by the communication unit 212, detects faces of users of the information processing device 500, 700 from the received captured image, and recognizes users of the other information processing device 500, 700, i.e., the users C and D or the users E and F, based on the detection result of faces. The captured image from the other information processing device 500, 700 is an example of a predetermined signal related to the behavior of users of the communication target device according to the disclosure. For example, the face recognition unit 204 recognizes users appearing in the captured image by detecting a face part of each user from the received capture image, computes information about the user's face (hereinafter referred to as "user face information") from the detected face part of the user, and comparing the computed user face information with user face information 223 for each user which is previously computed and stored in the storage unit 222. The act of appearing in a captured image is an example of the behavior in the disclosure. Note that the face recognition unit 204 may further recognize the gender, age or the like of users appearing in the captured image. Then, the face recognition unit 204 transmits a result of recognition of the users of the information processing device 500, 700 to the display image generation unit 206. Further, the face recognition unit 204 may recognize users of the information processing device 200, which are the users A and B, by receiving a captured image from the image input unit 202 and recognizing the faces of users of the information processing device 200 from the received captured image. The captured image from the image input unit 202 is an example of a predetermined signal related to the behavior of users of the information processing device according to the disclosure. The face recognition unit 204 may then transmit a result of recognition of the users of the information processing device 200 to the display image generation unit 206 or the communication unit 212.

Further, the face recognition unit 204 may recognize facial behaviors of the users of the other information processing device 500, 700 from the captured image from the other information processing device 500, 700. The act of changing facial behaviors is an example of the behavior in the disclosure. Then, the face recognition unit 204 may transmit a result of recognition of the facial behaviors of the users of the other information processing device 500, 700 to the display image generation unit 206. Note that the face recognition unit 204 may recognize facial behaviors of the users of the information processing device 200 from the captured image from the image input unit 202. Then, the face recognition unit 204 may transmit a result of recognition of facial behaviors of the users of the information processing device 200 to the display image generation unit 206 or the communication unit 212.

The display image generation unit 206, which is an example of a control unit in the disclosure, receives a result of recognition of the users of the other information processing device 500, 700 from the face recognition unit 204 and further receives a captured image captured in the other display system 400 or a captured image captured in the other display system 600 which is received by the communication unit 212. Then, based on the received result of recognition of the users of the other information processing device 500, 700, the display image generation unit 206 generates a display image in which user images representing the users of the other information processing device 500, 700 are displayed for each user. The detail of the display image is described later. Note that the display image generation unit 206 may generate the user images in the display image by extracting the users' facial parts from the received captured image captured in the other display system 400 or the received captured image captured in the other display system 600. Further, the display image generation unit 206 may use an avatar image representing each user, for example, as the user images in the display image. Then, the display image generation unit 206 transmits the generated display image to the display control unit 210.

Further, when the display image generation unit 206 receives a captured image captured in the display system 100 from the image input unit 202, receives a result of recognition of the users of the information processing device 200 and a result of recognition of the users of the other information processing device 500, 700 from the face recognition unit 204, and receives a captured image captured in the other display system 400 or a captured image captured in the other display system 600 which is received by the communication unit 212, the display image generation unit 206 generates a display image in which user images representing the users of the information processing device 200 and the other information processing device 500, 700 are displayed for each user based on the received result of recognition of the users of the information processing device 200 and users of the other information processing device 500, 700.

Further, when the communication unit 212 receives a result of recognition of users from a captured image captured in the other display system 400 or a result of recognition of users from a captured image captured in the other display system 600, the display image generation unit 206 may receive the result of recognition and generate a display image based on the result of recognition received from the communication unit 212 instead of a result of recognition by the face recognition unit 204. In this case, the above-described face recognition unit 204 may skip the recognition of users from the captured image from the other information processing device 500, 700.

Further, when the display image generation unit 206 further receives a result of recognition of facial behaviors of the users of the other information processing device 500, 700 from the face recognition unit 204, the display image generation unit 206 generates a display image in which a user image representing a user whose facial behavior has changed and the facial behavior are displayed in association with each other in the above-described display image based further on the received result of recognition of facial behaviors of the users of the other information processing device 500, 700. For example, when the display image generation unit 206 recognizes that a facial behavior of a certain user has changed to smiling, the display image generation unit 206 generates a display image in which a user image representing the user is displayed like jumping.

Further, when the display image generation unit 206 further receives a result of recognition of facial behaviors of the users of the information processing device 200 from the face recognition unit 204, the display image generation unit 206 generates a display image in which a user image representing a user whose facial behavior has changed and the facial behavior are displayed in association with each other in the above-described display image based further on the received result of recognition of facial behaviors of the users of the information processing device 200.

Further, when the communication unit 212 receives a result of recognition of facial behaviors of users from a captured image captured in the other display system 400 or a result of recognition of facial behaviors of users from a captured image captured in the other display system 600, the display image generation unit 206 may receive the result of recognition and generate a display image based on the result of recognition received from the communication unit 212 instead of a result of recognition by the face recognition unit 204.

Further, when the display image generation unit 206 receives a result of recognition of a speaker among the users of the other information processing device 500, 700 from the speech recognition unit 216, the display image generation unit 206 generates a display image in which a user image representing the speaker and the presence of a speech are displayed in association with each other in the above-described display image based further on the received result of recognition of the speaker among the users of the other information processing device 500, 700. For example, the display image generation unit 206 generates a display image in which a user image representing the speaker is displayed in a magnified form.

Further, when the display image generation unit 206 further receives a result of recognition of a speaker among the users of the information processing device 200 from the speech recognition unit 216, the display image generation unit 206 generates a display image in which a user image representing the speaker and the presence of a speech are displayed in association with each other based further on the received result of recognition of the speaker among the users of the information processing device 200.

Further, when the communication unit 212 receives a result of recognition of a speaker from a speech input to the other information processing device 500 or a result of recognition of a speaker from a speech input to the other information processing device 700, the display image generation unit 206 may receive the result of recognition and generate a display image based on the result of recognition received from the communication unit 212 instead of a result of recognition by the speech recognition unit 216.

Further, when the display image generation unit 206 further receives a result of recognition of contents of a speech by a speaker among the users of the other information processing device 500, 700 from the speech recognition unit 216, the display image generation unit 206 generates a display image in which a user image representing the speaker, the presence of a speech, and the contents of the speech are displayed in association with one another based further on the received result of recognition of the contents of the speech by the speaker among the users of the other information processing device 500, 700. For example, the display image generation unit 206 generates a display image in which a character image representing the contents of the speech is displayed within a dialogue balloon from a user image representing the speaker.

Further, when the display image generation unit 206 further receives a result of recognition of contents of a speech by a speaker among the users of the information processing device 200 from the speech recognition unit 216, the display image generation unit 206 generates a display image in which a user image representing the speaker, the presence of a speech, and the contents of the speech are displayed in association with one another based further on the received result of recognition of the contents of the speech by the speaker among the users of the information processing device 200.

Further, when the communication unit 212 receives a result of recognition of contents of a speech by a speaker from a speech input to the other information processing device 500 or a result of recognition of contents of a speech by a speaker from a speech input to the other information processing device 700, the display image generation unit 206 may receive the result of recognition and generate a display image based on the result of recognition received from the communication unit 212 instead of a result of recognition by the speech recognition unit 216.

Further, when the display image generation unit 206 receives a result of recognition of actions of the users of the other information processing device 500, 700 from the action recognition unit 220, the display image generation unit 206 generates a display image in which a user image representing an operator user and a specific operation are displayed in association with each other based further on the received result of recognition of actions of the users of the other information processing device 500, 700. For example, the display image generation unit 206 generates a display image in which a content image which the operator user intends to display is displayed within a dialogue balloon from a user image representing the operator user.

Further, when the display image generation unit 206 receives a result of recognition of actions of the users of the information processing device 200 from the action recognition unit 220, the display image generation unit 206 generates a display image in which a user image representing an operator user and a specific operation are displayed in association with each other based further on the received result of recognition of actions of the users of the information processing device 200.

Further, when the communication unit 212 receives a result of recognition of actions of users from an operation signal input to the other information processing device 500 or a result of recognition of actions of users from an operation signal input to the other information processing device 700, the display image generation unit 206 may receive the result of recognition and generate a display image based on the result of recognition received from the communication unit 212 instead of a result of recognition by the action recognition unit 220.

The output unit 208 receives a signal for driving the display device 102 from the display control unit 210, and transmits the received signal to the display device 102. Further, when the output unit 208 receives a speech input to the other information processing device 500, 700 which is received by the communication unit 212, the output unit 208 may transmit the received speech to a speaker unit (not shown) or the like of the display system 100.

The display control unit 210, which is an example of a control in the disclosure, receives a display image from the display image generation unit 206. Further, a content of a still image or a moving image is supplied to the display control unit 210. Then, the display control unit 210 transmits a signal for displaying the display image generated by the display image generation unit 206 on the display screen of the display device 102 to the output unit 208. Further, the display control unit 210 may transmit a signal for displaying the content on the display screen of the display device 102 to the output unit 208.

The communication unit 212 receives the captured image captured in the other display system 400, and the speech and the operation signal input to the other information processing device 500 from the communication server 300 through the communication network 800. Further, the communication unit 212 receives the captured image captured in the other display system 600 and the speech and the operation signal input to the other information processing device 700 from the communication server 300 through the communication network 800. Note that the communication unit 212 may receive the captured image captured in the other display system 400 and the speech and the operation signal input to the other information processing device 500 directly from other information processing device 500 through the communication network 800. Likewise, the communication unit 212 may receive the captured image captured in the other display system 600 and the speech and the operation signal input to the other information processing device 700 directly from other information processing device 700 through the communication network 800.

Further, the communication unit 212 may receive a result of recognition of users from the captured image captured in the other display system 400, a result of recognition from the speech or a result of recognition from the operation signal input to the other information processing device 500, a result of recognition of users from the captured image captured in the other display system 600, or a result of recognition from the speech or a result of recognition from the operation signal input to the other information processing device 700 from the communication server 300 through the communication network 800. Note that the communication unit 212 may receive a result of recognition of users from the captured image captured in the other display system 400 and a result of recognition from the speech or a result of recognition from the operation signal input to the other information processing device 500 directly from the other information processing device 500 through the communication network 800. Likewise, the communication unit 212 may receive a result of recognition of users from the captured image captured in the other display system 600 and a result of recognition from the speech or a result of recognition from the operation signal input to the other information processing device 700 directly from the other information processing device 700 through the communication network 800.

Further, the communication unit 212 may receive the captured image from the image input unit 202, the speech from the speech input unit 214, and the operation signal from the operation signal input unit 218, and transmit the received captured image, speech and operation signal to the communication server 300 through the communication network 800. Further, the communication unit 212 may receive a result of recognition of users from the captured image captured in the display system 100 from the face recognition unit 204, a result of recognition from the speech input to the information processing device 200 from the speech recognition unit 216, and a result of recognition from the operation signal input to the information processing device 200 from the action recognition unit 220, and transmit the received results of recognition to the communication server 300 through the communication network 800. Note that the communication unit 212 may transmit the received captured image, speech and operation signal, the received result of recognition of users from the captured image, result of recognition from the speech and result of recognition from the operation signal directly to the other information processing device 500, 700 through the communication network 800.

The speech input unit 214, which is an example of an input unit in the disclosure, receives a speech from the users A and B, which are users of the information processing device 200, for example. Then, the speech input unit 214 transmits the received (input) speech to the communication unit 212. Further, the speech input unit 214 may transmit the received speech to the speech recognition unit 216.

The speech recognition unit 216, which is an example of a recognition unit in the disclosure, receives a speech from the other information processing device 500, 700 which is received by the communication unit 212, and recognizes a speaker among the users of the other information processing device 500, 700 from the received speech. The act of speaking in an example of the behavior in the disclosure. The speech from the other information processing device 500, 700 is an example of a predetermined signal related to the behavior of users of the communication target device according to the disclosure. For example, the speech recognition unit 216 recognizes a speaker by extracting a feature from the received speech, generating information about the user's speech (hereinafter referred to as "user speech information"), and comparing the generated user speech information with user speech information 224 for each user which is previously generated and stored in the storage unit 222. Then, the speech recognition unit 216 transmits a result of recognition of a speaker among the users of the information processing device 500, 700 to the display image generation unit 206. Further, the speech recognition unit 216 may receive a speech from the speech input unit 214 and recognize a speaker among the users of the information processing device 200 from the received speech. The speech from the speech input unit 214 is an example of a predetermined signal related to the behavior of users of the information processing device according to the disclosure. The speech recognition unit 216 may then transmit a result of recognition of a speaker among the users of the information processing device 200 to the display image generation unit 206 or the communication unit 212.

Further, the speech recognition unit 216 may recognize contents of a speech by a speaker among the users of the other information processing device 500, 700 from the speech from the other information processing device 500, 700. For example, the speech recognition unit 216 analyzes the received speech and thereby extracts and recognizes the contents of the speech by the user as character data. Then, the speech recognition unit 216 may transmit a result of recognition of the contents of the speech by the speaker among the users of the other information processing device 500, 700 to the display image generation unit 206. Further, the display image generation unit 206 may recognize contents of a speech by a speaker among the users of the information processing device 200 from the speech from the speech input unit 214. Then, the speech recognition unit 216 may transmit a result of recognition of the contents of the speech by the speaker among the users of the information processing device 200 to the display image generation unit 206 or the communication unit 212.

The operation signal input unit 218, which is an example of an input unit in the disclosure, receives an operation signal by the user A or B, the user of the information processing device 200, for example, which is transmitted using a remote controller (not shown), for example. Then, the operation signal input unit 218 transmits the received (input) operation signal to the communication unit 212. Further, the operation signal input unit 218 may transmit the received operation signal to the action recognition unit 220.

The action recognition unit 220, which is an example of a recognition unit in the disclosure, receives an operation signal from the other information processing device 500, 700 which is received by the communication unit 212, and recognizes actions of the users of the other information processing device 500, 700 from the received operation signal. The act of taking action is an example of the behavior in the disclosure. The operation signal from the other information processing device 500, 700 is an example of a predetermined signal related to the behavior of users of the communication target device according to the disclosure. For example, the action recognition unit 220 recognizes a user as an operator by extracting information about equipment of an operator user (hereinafter referred to as "user equipment information") that is contained in the operation signal from the received operation signal, and comparing the extracted user equipment information with user equipment information 226 for each user which is previously generated and stored in the storage unit 222. Further, the action recognition unit 220 recognizes a specific operation of the operator by extracting information about a specific operation which is contained in the operation signal from the received operation signal, for example. For example, the action recognition unit 220 recognizes a content which the operator user intends to display on the display screen by comparing information about a content which the operator user intends to display on the display screen (hereinafter referred to as "user content information") that is contained in the information about a specific operation with user content information 225 that is previously stored in the storage unit 222. Then, the action recognition unit 220 transmits a result of recognition of actions of the users of the other information processing device 500, 700 to the display image generation unit 206. Further, the action recognition unit 220 may receive an operation signal from the operation signal input unit 218 and recognize actions of the users of the information processing device 200 from the received operation signal. The operation signal from the operation signal input unit 218 is an example of a predetermined signal related to the behavior of users of the information processing device according to the disclosure. Then, the action recognition unit 220 may transmit a result of recognition of actions of the users of the information processing device 200 to the display image generation unit 206 or the communication unit 212.

The storage unit 222 stores user face information 223 that is information about the faces of the users of the other information processing device 500, 700 or the information processing device 200, user speech information 224 that is information about the speeches of the users of the other information processing device 500, 700 or the information processing device 200, user content information 225 that is information about the contents of the users of the other information processing device 500, 700 or the information processing device 200, and user equipment information 226 that is information about the equipments used by the users of the other information processing device 500, 700 or the information processing device 200.

It should be noted that the predetermined signal related to the behavior of users of the communication target device according to the disclosure is not limited to the captured image, the speech and the operation signal from the other information processing device 500, 700 described above, and it may be any signal from the other information processing device 500, 700 which is generated as a result that a user of the other information processing device 500, 700 performs some acts. Further, the predetermined signal related to the behavior of users of the information processing device according to the disclosure is not limited to the captured image, the speech and the operation signal which are input to the information processing device 200 described above, and it may be any signal which is generated as a result that a user of the information processing device 200 performs some acts.

(3. Hardware Configuration of Information Processing Device)

Figure 3:
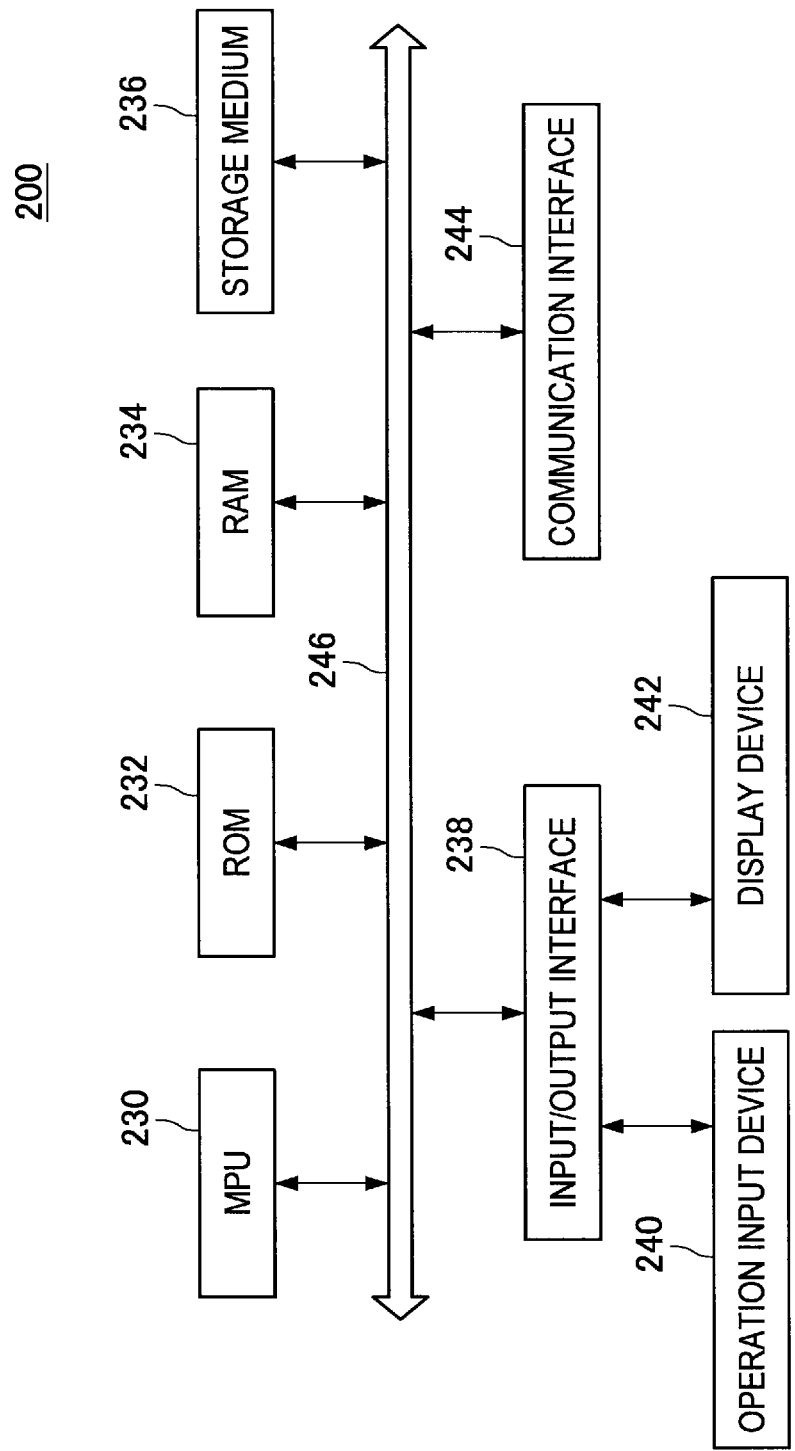
FIG. 3 is an explanatory view illustrating an example of a hardware configuration of the information processing device in FIG. 2.

A hardware configuration of the information processing device 200 in FIG. 2 is described hereinbelow. FIG. 3 is an explanatory view illustrating an example of a hardware configuration of the information processing device 200 in FIG. 2.

In FIG. 3, the information processing device 200 includes an MPU 230, a ROM 232, a RAM 234, a recording medium 236, an input/output interface 238, an operation input device 240, a display device 242, and a communication interface 244, for example. Further, in the information processing device 200, the components are connected through a bus 246 as a data transmission line, for example.

The MPU 230 is configured as an MPU (Micro Processing Unit), an integrated circuit in which a plurality of circuits for implementing various functions such as image processing are integrated or the like, and functions as a control unit (not shown) that controls the information processing device 200 as a whole. Further, the MPU 230 acts as the face recognition unit 204, the display image generation unit 206, the display control unit 210, the speech recognition unit 216 and the action recognition unit 220 in the information processing device 200.

The ROM 232 stores programs to be used by the MPU 230, control data such as operation parameters and the like. The RAM 234 temporarily stores a program executed by the MPU 230, for example.

The recording medium 236 functions as the storage unit 222, and stores various kinds of data (or database) such as the user face information, the user speech information, the user content information and the user equipment information, applications, and the like. The recording medium 236 may be a magnetic recording medium such as hard disk, nonvolatile memory such as EEPROM (Electrically Erasable and Programmable Read Only Memory), flash memory, MRAM (Magnetoresistive Random Access Memory), FeRAM (Ferroelectric Random Access Memory), PRAM Phase change Random Access Memory), and the like. Further, the information processing device 200 may include a recording medium 236 which is removable from the information processing device 200.

The input/output interface 238 connects to the operation input device 240 and the display device 242, for example. Further, the input/output interface 238 may act as the image input unit 202, the output unit 208, the speech input unit 214 and the operation signal input unit 218. The operation input device 240 functions as an operation unit (not shown), and the display device 242 functions as a display unit 254 in FIG. 15, which is described later. The input/output interface 238 may be a USB (Universal Serial Bus) terminal, a DVI (Digital Visual Interface) terminal, an HDMI (High-Definition Multimedia Interface) terminal, or various processing circuits, for example. Further, the operation input device 240 is mounted on the information processing device 200 and connected with the input/output interface 238 inside the information processing device 200, for example. The operation input device 240 may be a button, a cursor key, a rotating selector such as Jog Dial, or a combination of those, for example. Furthermore, the display device 242 is mounted on the information processing device 200 and connected with the input/output interface 238 inside the information processing device 200, for example. The display device 242 may be a liquid crystal display (LCD), or an organic EL display (organic ElectroLuminescence display. Also called an OLED display (Organic Light Emitting Diode display)) and the like, for example. Note that the input/output interface 238 can also connect to external devices of the information processing device 200, such as an operation input device (e.g. a keyboard, a mouse), a display device (e.g. an external display device such as the display device 102) and an imaging device (e.g. the imaging device 104). Further, the display device 242 may be a device capable of display and user operation, such as a touch screen, for example.

The communication interface 244 is a communication means included in the information processing device 200, and functions as the communication unit 212 for performing wireless/wired communication with external devices such as the communication server 300 and the other information processing device 500, 700, for example, through the communication network 800 (or directly). The communication interface 244 may be a communication antenna and an RF circuit (wireless communication), IEEE802.15.1 port and a transmitting and receiving circuit (wireless communication), IEEE802.11b port and a transmitting and receiving circuit (wireless communication), or a LAN terminal and a transmitting and receiving circuit (wired communication) and the like, for example.

It should be noted that the hardware configuration of the information processing device 200 according to the embodiment is not limited to the configuration shown in FIG. 3. For example, the information processing device 200 may include a speech output device composed of a DSP (Digital Signal Processor), an amplifier, a speaker and the like, which acts as a speech output unit (not shown).

Further, the information processing device 200 may include an imaging device composed of a lens/image pickup device and a signal processing circuit, which acts as an imaging unit 252 in FIG. 15, for example. In this case, the information processing device 200 can process the captured image generated in its own device. The lens/image pickup device is made up of an optical lens and an image sensor composed of a plurality of image pickup devices such as CCD (Charge Coupled Device) or CMOS (Complementary Metal Oxide Semiconductor), for example. The signal processing circuit includes an AGC (Automatic Gain Control) circuit and an ADC (Analog to Digital Converter), for example, and converts an analog signal generated by the image pickup device into a digital signal (image data) and performs various signal processing. The signal processing that is performed by the signal processing circuit may be White Balance correction, interpolation, color tone correction, gamma correction, YCbCr conversion, edge enhancement, coding and the like, for example.

Further, the information processing device 200 may have a configuration in which the operation input device 240 and the display device 242 shown in FIG. 3 are not included, for example.

(4. Display Process)

A display process that is executed by the information processing device 200 in FIG. 2 is described hereinbelow. FIG. 4 is a flowchart of the display process executed by the information processing device 200 in FIG. 2.

Figure 4:
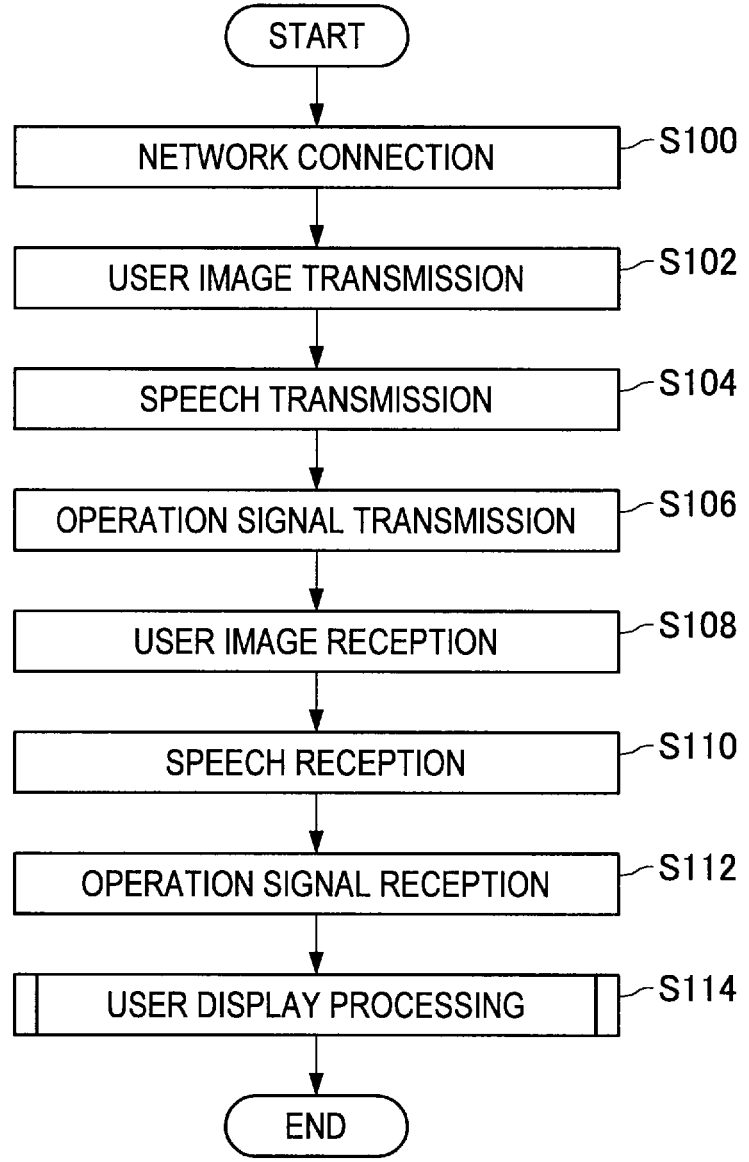
FIG. 4 is a flowchart of a display process executed by the information processing device in FIG. 2.

Referring to FIG. 4, when an instruction for network connection with the users C and D and the users E and F is given from the user A, for example, in the information processing device 200, the communication unit 212 becomes able to communicate with the communication server 300 through the communication network 800 (Step S100). Note that, in Step S100, the communication unit 212 may become able to communicate with the other information processing device 500, 700 directly through the communication network 800.

Next, the communication unit 212 transmits a captured image which is generated by imaging in the imaging device 104 in the display system 100 and received via the image input unit 202 to the communication server 300 through the communication network 800 (Step S102). Note that, in Step S102, the communication unit 212 may transmit a result of recognition of the users of the information processing device 200 and a result of recognition of facial behaviors of the users of the information processing device 200 which are received from the face recognition unit 204 to the communication server 300 through the communication network 800. Further, in Step S102, the communication unit 212 may transmit the captured image, a result of recognition of the users, and a result of recognition of facial behaviors of the users to the other information processing device 500, 700 directly through the communication network 800.

Then, the communication unit 212 transmits a speech which has been input to the information processing device 200 and received via the speech input unit 214 to the communication server 300 through the communication network 800 (Step S104). Note that, in Step S104, the communication unit 212 may transmit a result of recognition of a speaker among the users of the information processing device 200 and a result of recognition of contents of a speech by a speaker among the users of the information processing device 200 which are received from the speech recognition unit 216 to the communication server 300 through the communication network 800. Further, in Step S104, the communication unit 212 may transmit the speech, a result of recognition of a speaker among the users, a result of recognition of contents of a speech by a speaker among the users to the other information processing device 500, 700 directly through the communication network 800.

Then, the communication unit 212 transmits an operation signal which has been input to the information processing device 200 and received via the operation signal input unit 218 to the communication server 300 through the communication network 800 (Step S106). Note that, in Step S106, the communication unit 212 may transmit a result of recognition of actions of the users of the information processing device 200 which is received from the action recognition unit 220 to the communication server 300 through the communication network 800. Further, in Step S106, the communication unit 212 may transmit the operation signal and a result of recognition of actions of the users to the other information processing device 500, 700 directly through the communication network 800.

After that, the communication unit 212 receives a captured image which has been captured in the display system 400 and transmitted from the other information processing device 500 from the communication server 300. Further, the communication unit 212 receives a captured image which has been captured in the display system 600 and transmitted from the other information processing device 700 from the communication server 300 (Step S108). Note that, in Step S108, the communication unit 212 may receive a result of recognition of users and a result of recognition of facial behaviors of users from the captured image which has been captured in the display system 400 and transmitted from the other information processing device 500, and a result of recognition of users and a result of recognition of facial behaviors of users from the captured image which has been captured in the display system 600 and transmitted from the other information processing device 700 from the communication server 300. Further, in Step S108, the communication unit 212 may receive the captured image, a result of recognition of users, and a result of recognition of facial behaviors of the users from the other information processing device 500, 700 directly through the communication network 800.

Then, the communication unit 212 receives a speech which has been input to the other information processing device 500 and transmitted from the other information processing device 500 from the communication server 300. Further, the communication unit 212 receives a speech which has been input to the other information processing device 700 and transmitted from the other information processing device 700 from the communication server 300 (Step S110). Note that, in Step S110, the communication unit 212 may receive a result of recognition of a speaker among users and a result of recognition of contents of a speech by a speaker among users from the speech which has been input to the other information processing device 500 and transmitted from the other information processing device 500, and a result of recognition of a speaker among users and a result of recognition of contents of a speech by a speaker among users from the speech which has been input to the other information processing device 700 and transmitted from the other information processing device 700 from the communication server 300. Further, in Step S110, the communication unit 212 may receive the speech, a result of recognition of a speaker among the users, a result of recognition of contents of a speech by a speaker among the users from the other information processing device 500, 700 directly through the communication network 800.

Then, the communication unit 212 receives an operation signal which has been input to the other information processing device 500 and transmitted from the other information processing device 500 from the communication server 300. Further, the communication unit 212 receives an operation signal which has been input to the other information processing device 700 and transmitted from the other information processing device 700 from the communication server 300 (Step S112). Note that, in Step S112, the communication unit 212 may receive a result of recognition of actions of users from the operation signal which has been input to the other information processing device 500 and transmitted from the other information processing device 500, and a result of recognition of actions of users from the operation signal which has been input to the other information processing device 700 and transmitted from the other information processing device 700 from the communication server 300. Further, in Step S112, the communication unit 212 may receive the operation signal and a result of recognition of actions of the users from the other information processing device 500, 700 directly through the communication network 800.

After that, the information processing device 200 performs user display processing in FIG. 5, which is described later (Step S114) so that user images representing the users of the information processing device 200 and the other information processing device 500, 700 are displayed for each user, and a user image representing a user who has performed a behavior and a detail of the behavior are displayed in association with each other on the display screen of the display device 102, for example.

Figure 5:
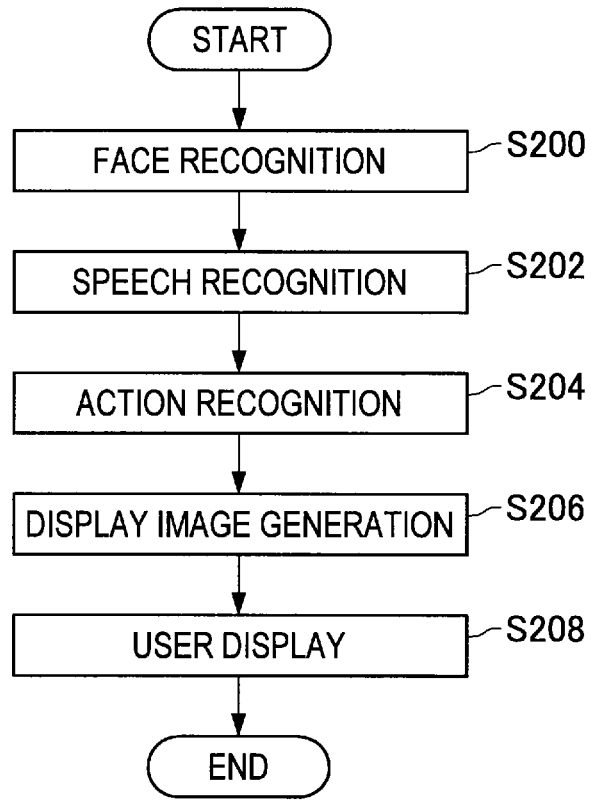
FIG. 5 is a flowchart of user display processing performed in Step S114 in the display process in FIG. 4.

FIG. 5 is a flowchart of the user display processing that is performed in Step S114 in the display process of FIG. 4.

Referring to FIG. 5, the face recognition unit 204 first receives a captured image from the other information processing device 500, 700 which is received by the communication unit 212, detects faces of the users of the information processing device 500, 700 from the received captured image, and recognizes users of the information processing device 500, 700, i.e., the users C and D or the users E and F, based on the detection result of faces (Step S200). Further, in Step S200, the face recognition unit 204 may detect faces of the users of the information processing device 500, 700 from the received captured image, and recognize facial behavior of the users of the information processing device 500, 700, i.e., the users C and D or the users E and F, based on the detection result of faces. Furthermore, in Step S200, the face recognition unit 204 may receive a captured image from the image input unit 202, detect faces of the users of the information processing device 200 from the received captured image, and recognize users of the information processing device 200, i.e., the users A and B or recognize facial behavior of the users of the information processing device 200, i.e., the users A and B, based on the detection result of faces.

Next, the speech recognition unit 216 receives a speech from the other information processing device 500, 700 which is received by the communication unit 212, and recognizes a speaker among the users of the information processing device 500, 700 from the received speech (Step S202). Further, in Step S202, the speech recognition unit 216 may receive a speech from the other information processing device 500, 700 which is received by the communication unit 212, and recognizes contents of a speech by a speaker among the users of the information processing device 500, 700 from the received speech. Further, in Step S202, the speech recognition unit 216 may receive a speech from the speech input unit 214 and recognize a speaker among the users of the information processing device 200 or recognize contents of a speech by a speaker among the users from the received speech.

Then, the action recognition unit 220 receives an operation signal from the other information processing device 500, 700 which is received by the communication unit 212, and recognizes actions of the users of the information processing device 500, 700 from the received operation signal (Step S204). Further, in Step S204, the action recognition unit 220 may receive an operation signal from the operation signal input unit 218 and recognize actions of the users of the information processing device 200 from the received operation signal.

After that, the display image generation unit 206 receives a result of recognition of the users of the other information processing device 500, 700 from the face recognition unit 204, and receives the captured image captured in the other display system 400 or the captured image captured in the other display system 600 which is received by the communication unit 212. Then, based on the received result of recognition of the users of the other information processing device 500, 700, the display image generation unit 206 generates a display image in which user images representing the users of the other information processing device 500, 700 are displayed for each user (Step S206).

Further, in Step S206, when the display image generation unit 206 receives a captured image captured in the display system 100 from the image input unit 202, receives a result of recognition of the users of the information processing device 200 and a result of recognition of the users of the other information processing device 500, 700 from the face recognition unit 204, and receives a captured image captured in the other display system 400 or a captured image captured in the other display system 600 which is received by the communication unit 212, the display image generation unit 206 generates a display image in which user images representing the users of the information processing device 200 and the other information processing device 500, 700 are displayed for each user based on the received results of recognition of the users of the information processing device 200 and the users of the other information processing device 500, 700.

Further, in Step S206, when the communication unit 212 receives a result of recognition of users from a captured image captured in the other display system 400 or a result of recognition of users from a captured image captured in the other display system 600, the display image generation unit 206 may receive the result of recognition and generate a display image based on the result of recognition received from the communication unit 212 instead of a result of recognition by the face recognition unit 204.

Further, in Step S206, when the display image generation unit 206 further receives a result of recognition of facial behaviors of the users of the other information processing device 500, 700 from the face recognition unit 204, the display image generation unit 206 generates a display image in which a user image representing a user whose facial behavior has changed and the facial behavior are displayed in association with each other in the above-described display image based further on the received result of recognition of facial behaviors of the users of the other information processing device 500, 700.

Further, in Step S206, when the display image generation unit 206 further receives a result of recognition of facial behaviors of the users of the information processing device 200 from the face recognition unit 204, the display image generation unit 206 generates a display image in which a user image representing a user whose facial behavior has changed and the facial behavior are displayed in association with each other based further on the received result of recognition of facial behaviors of the users of the information processing device 200.

Further, in Step S206, when the communication unit 212 receives a result of recognition of facial behaviors of users from a captured image captured in the other display system 400 or a result of recognition of facial behaviors of users from a captured image captured in the other display system 600, the display image generation unit 206 may receive the result of recognition and generate a display image based on the result of recognition received from the communication unit 212 instead of a result of recognition by the face recognition unit 204.

Further, in Step S206, when the display image generation unit 206 receives a result of recognition of a speaker among the users of the other information processing device 500, 700 from the speech recognition unit 216, the display image generation unit 206 generates a display image in which a user image representing the speaker and the presence of a speech are displayed in association with each other in the above-described display image based further on the received result of recognition of the speaker among the users of the other information processing device 500, 700.

Further, in Step S206, when the display image generation unit 206 further receives a result of recognition of a speaker among the users of the information processing device 200 from the speech recognition unit 216, the display image generation unit 206 generates a display image in which a user image representing the speaker and the presence of a speech are displayed in association with each other based further on the received result of recognition of the speaker among the users of the information processing device 200.

Further, in Step S206, when the communication unit 212 receives a result of recognition of a speaker from a speech input to the other information processing device 500 or a result of recognition of a speaker from a speech input to the other information processing device 700, the display image generation unit 206 may receive the result of recognition and generate a display image based on the result of recognition received from the communication unit 212 instead of a result of recognition by the speech recognition unit 216.

Further, in Step S206, when the display image generation unit 206 further receives a result of recognition of contents of a speech by a speaker among the users of the other information processing device 500, 700 from the speech recognition unit 216, the display image generation unit 206 generates a display image in which a user image representing the speaker, the presence of a speech, and the contents of the speech are displayed in association with one another based further on the received result of recognition of the contents of the speech by the speaker among the users of the other information processing device 500, 700.

Further, in Step S206, when the display image generation unit 206 further receives a result of recognition of contents of a speech by a speaker among the users of the information processing device 200 from the speech recognition unit 216, the display image generation unit 206 generates a display image in which a user image representing the speaker, the presence of a speech, and the contents of the speech are displayed in association with one another based further on the received result of recognition of the contents of the speech by the speaker among the users of the information processing device 200.

Further, in Step S206, when the communication unit 212 receives a result of recognition of contents of a speech by a speaker from a speech input to the other information processing device 500 or a result of recognition of contents of a speech by a speaker from a speech input to the other information processing device 700, the display image generation unit 206 may receive the result of recognition and generate a display image based on the result of recognition received from the communication unit 212 instead of a result of recognition by the speech recognition unit 216.

Further, in Step S206, when the display image generation unit 206 receives a result of recognition of actions of the users of the other information processing device 500, 700 from the action recognition unit 220, the display image generation unit 206 generates a display image in which a user image representing an operator user and a specific operation are displayed in association with each other based further on the received result of recognition of actions of the users of the other information processing device 500, 700.

Further, in Step S206, when the display image generation unit 206 receives a result of recognition of actions of the users of the information processing device 200 from the action recognition unit 220, the display image generation unit 206 generates a display image in which a user image representing an operator user and a specific operation are displayed in association with each other based further on the received result of recognition of actions of the users of the information processing device 200.

Further, in Step S206, when the communication unit 212 receives a result of recognition of actions of users from an operation signal input to the other information processing device 500 or a result of recognition of actions of users from an operation signal input to the other information processing device 700, the display image generation unit 206 may receive the result of recognition and generate a display image based on the result of recognition received from the communication unit 212 instead of a result of recognition by the action recognition unit 220.

After that, the display control unit 210 receives a display image from the display image generation unit 206, and transmits a signal for displaying the received display image on the display screen of the display device 102 to the output unit 208. Then, the output unit 208 transmits the signal for displaying the received display image to the display device 102. As a result, a display image in which user images representing the users of the other information processing device 500, 700 are displayed for each user, a display image in which user images representing the users of the information processing device 200 and the other information processing device 500, 700 are displayed for each user, a display image in which user images representing the users of the other information processing device 500, 700 are displayed for each user and a user image representing a user who has performed a behavior and a detail of the behavior are displayed in association with each other, and a display image in which user images representing the users of the information processing device 200 and the other information processing device 500, 700 are displayed for each user and a user image representing a user who has performed a behavior and a detail of the behavior are displayed in association with each other are displayed on the display screen of the display device 102 (Step S208). The processing thereby ends.

According to the display process of FIG. 4, a display image in which user images representing the users of the other information processing device 500, 700 are displayed for each user is displayed on the display screen of the display device 102. Thus, even when there are a plurality of users of the other information processing device 500, for example, a user of the information processing device 200 can be surely aware of the existence of any user of the other information processing device 500 because the user images representing the respective users of the other information processing device 500 are displayed for each of the users on the display screen of the display device 102.

Further, according to the display process of FIG. 4, a display image in which user images representing the users of the information processing device 200 and the other information processing device 500, 700 are displayed for each user is displayed on the display screen of the display device 102. Thus, a user of the information processing device 200 can be surely aware of the existence of any user of the other information processing device 500 and can feel a sense of realism, a sense of togetherness, a sense of closeness and the like as if communicating with them in the same place.

Further, according to the display process of FIG. 4, a display image in which user images representing the users of the other information processing device 500, 700 are displayed for each user, and a user image representing a user who has performed a behavior and a detail of the behavior are displayed in association with each other is displayed on the display screen of the display device 102. Thus, a user of the information processing device 200 can be surely aware of the existence of any user of the other information processing device 500 and, even when there are a plurality of users of the other information processing device 500, for example, can be surely aware of which user of the other information processing device 500 has performed a behavior because a user image representing a user who has performed a behavior and a detail of the behavior are displayed in association with each other on the display screen of the display device 102.

Further, according to the display process of FIG. 4, a display image in which user images representing the users of the information processing device 200 and the other information processing device 500, 700 are displayed for each user, and a user image representing a user who has performed a behavior and a detail of the behavior are displayed in association with each other is displayed on the display screen of the display device 102. Thus, a user of the information processing device 200 can be surely aware of the existence of any user of the other information processing device 500, can feel a sense of realism, a sense of togetherness, a sense of closeness and the like as if communicating with them in the same place, and further can be surely aware of which user of the other information processing device 500 has performed a behavior.

(5. Examples)

Examples of the disclosure are described hereinbelow. FIGS. 6A to 6D and FIGS. 7A to 7D are explanatory views illustrating an example 1 of the disclosure. In the example 1, a case where an instruction for network connection with the users C and D is given by the user A, for example, in the information processing device 200 of FIG. 2, and a display image in which user images representing the users of the information processing device 200 and the other information processing device 500, 700 are displayed for each user, and a user image representing a user who has performed a behavior and a detail of the behavior are displayed in association with each other is displayed on the display screen of the display device 102 in FIG. 2 and the display screen in the display system 400 is described by way of illustration.

Figure 6A:
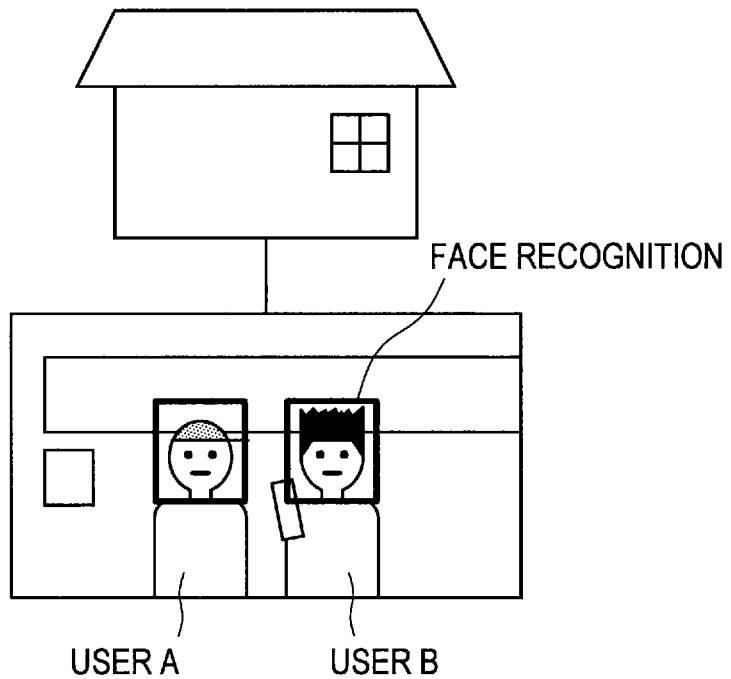
[FIG. 6A] to [FIG. 6D]
Figure 6B:
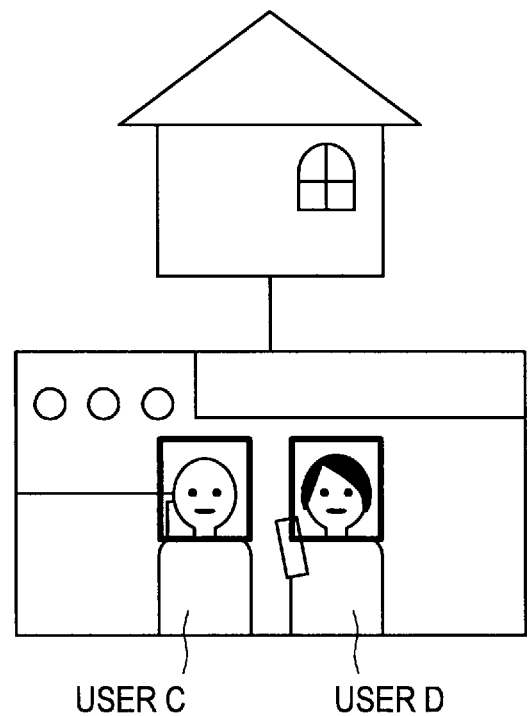
Figure 6C:
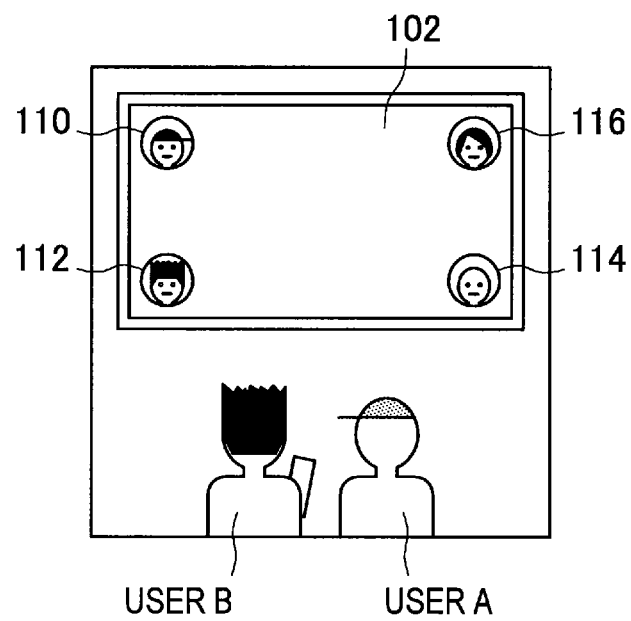
Figure 6D:
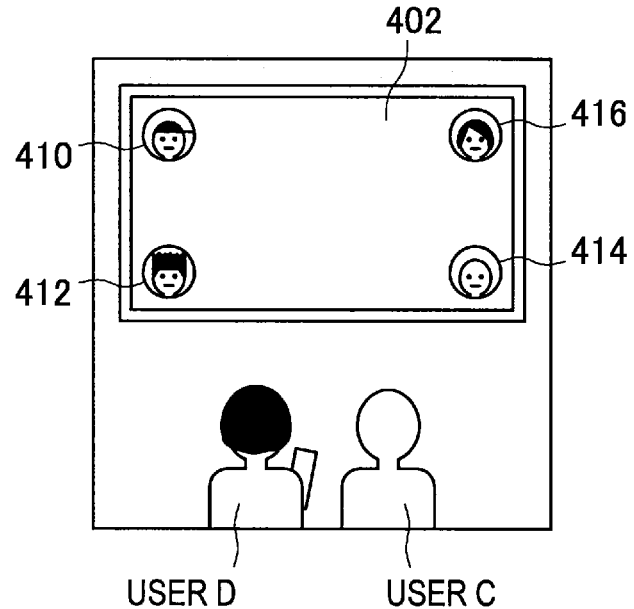

First, the information processing device 200 receives a captured image shown in FIG. 6A and a captured image shown in FIG. 6B, and recognizes the users A and B of the information processing device 200 and the users C and D of the other information processing device 500 by the above-described face recognition. Then, as shown in FIG. 6C, the information processing device 200 displays a display image in which a user image 110 representing the user A of the information processing device 200, a user image 112 representing the user B of the information processing device 200, a user image 114 representing the user C of the other information processing device 500, and a user image 116 representing the user D of the other information processing device 500 are displayed for each user on the display screen of the display device 102. Likewise, as shown in FIG. 6D, the other information processing device 500 displays a display image in which a user image 410 representing the user A of the information processing device 200, a user image 412 representing the user B of the information processing device 200, a user image 414 representing the user C of the other information processing device 500, and a user image 416 representing the user D of the other information processing device 500 are displayed for each user on the display screen of a display device 402 in the display system 400.

Figure 7A:
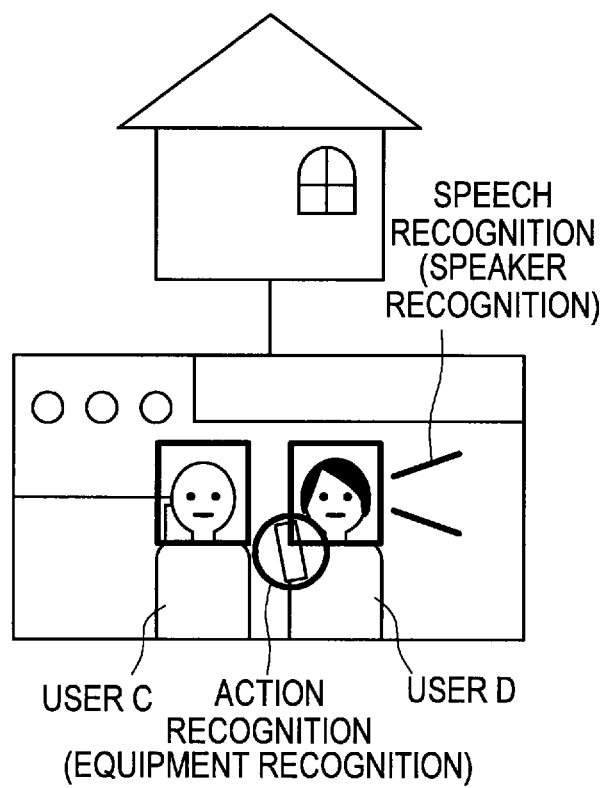
[FIG. 7A] to [FIG. 7D]
Figure 7B:
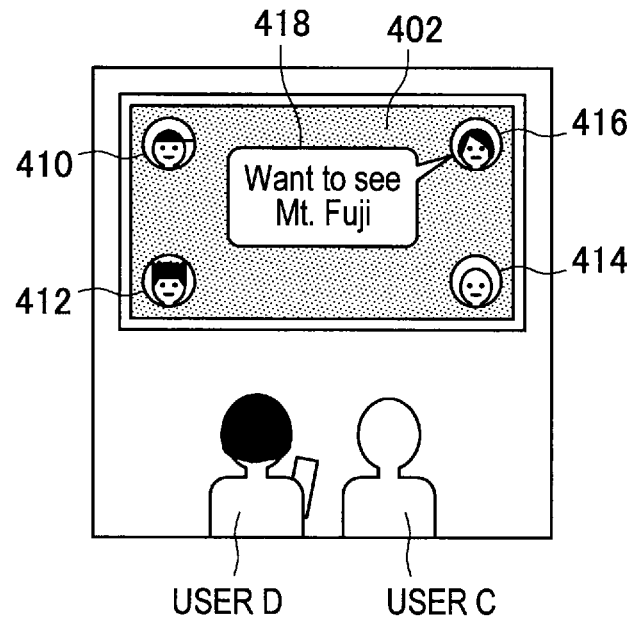

Next, as shown in FIG. 7A, when a speech saying "I want to see Mt. Fuji", for example, is made as a behavior by the user D, the other information processing device 500 receives the speech and recognizes the user D as a speaker among the users of the other information processing device 500 and the contents of the speech by the user D by the above-described speech recognition. Then, as shown in FIG. 7B, the other information processing device 500 displays a display image in which a character image representing the contents of the speech, which is the image "I want to see Mt. Fuji", is displayed within a dialogue balloon 418 from the user image 416 representing the user D as a speaker. Likewise, the information processing device 200 displays a display image in which a character image representing the contents of the speech, which is the image "I want to see Mt. Fuji", is displayed within a dialogue balloon (not shown) from the user image 116 representing the user D as a speaker on the display screen of the display device 102, although not shown.

Further, as shown in FIG. 7A, when transmission of the character data "I want to see Mt. Fuji" is performed using a remote controller, for example, as a behavior by the user D, the other information processing device 500 receives the operation signal and recognizes the user D as an operator among the users of the other information processing device 500 and a specific operation performed by the operator by the above-described action recognition. Then, as shown in FIG. 7B, the other information processing device 500 displays a display image in which a character image representing the specific operation by the operator, which is the image "I want to see Mt. Fuji", is displayed within a dialogue balloon 418 from the user image 416 representing the user D as a speaker on the display screen of the display device 402. Likewise, the information processing device 200 displays a display image in which a character image representing the specific operation by the operator, which is the image "I want to see Mt. Fuji", is displayed within a dialogue balloon (not shown) from the user image 116 representing the operator user D on the display screen of the display device 102, although not shown.

Figure 7C:
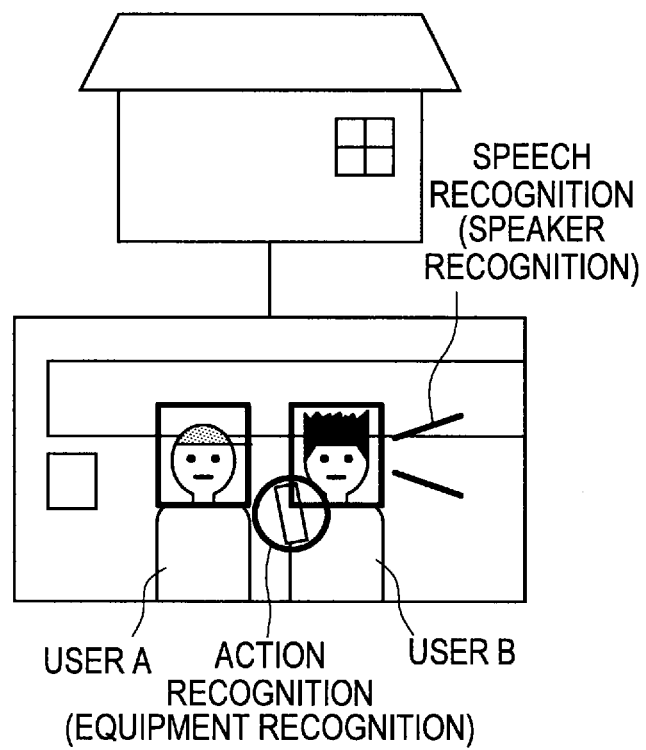
Figure 7D:
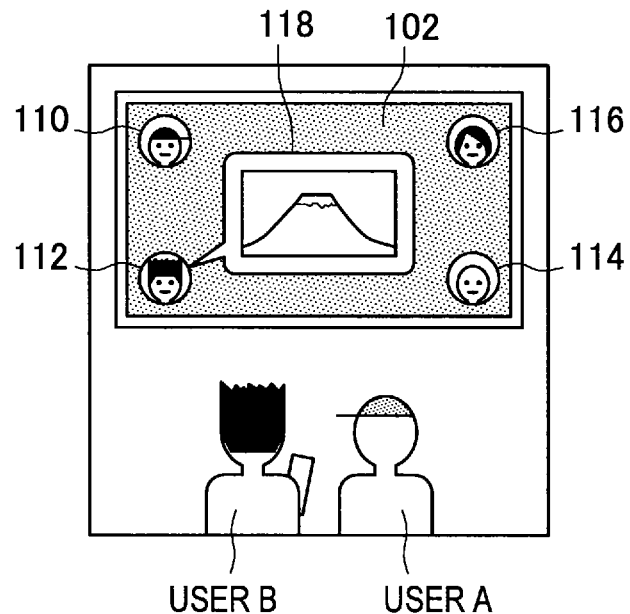

Then, as shown in FIG. 7C, when transmission of a request for display of "the content of Mt. Fuji" is performed using a remote controller, for example, as a behavior by the user B, the information processing device 200 receives the operation signal and recognizes the user B as an operator among the users of the information processing device 200 and a specific operation performed by the operator by the above-described action recognition. Then, as shown in FIG. 7D, the information processing device 200 displays a display image in which a content image which the operator user B intends to display, which is the image of "the content of Mt. Fuji", is displayed within a dialogue balloon 118 from the user image 112 representing the operator user B on the display screen of the display device 102. Likewise, the other information processing device 500 displays a display image in which a content image which the operator user B intends to display, which is the image of "the content of Mt. Fuji", is displayed within a dialogue balloon (not shown) from the user image 412 representing the operator user B on the display screen of the display device 402, although not shown. At this time, the other information processing device 500 may receive a content image which the operator user B intends to display, which is the image of "the content of Mt. Fuji", from the information processing device 200 or receive the content image from another device through the communication network 800, for example.

According to the example 1, a user of the information processing device 200 and the other information processing device 500 can be surely aware of the existence of any user of the information processing device 200 and the other information processing device 500, can feel a sense of realism, a sense of togetherness, a sense of closeness and the like as if communicating with them in the same place, and further can be surely aware of which user of the information processing device 200 and the other information processing device 500 has performed a behavior.

FIGS. 8A to 8D are explanatory views illustrating an example 2 of the disclosure. In the example 2, a case where an instruction for network connection with the users C and D is given by the user A, for example, in the information processing device 200 of FIG. 2, and the user A goes away during network connection with the users C and D is described by way of illustration.

Figure 8A:
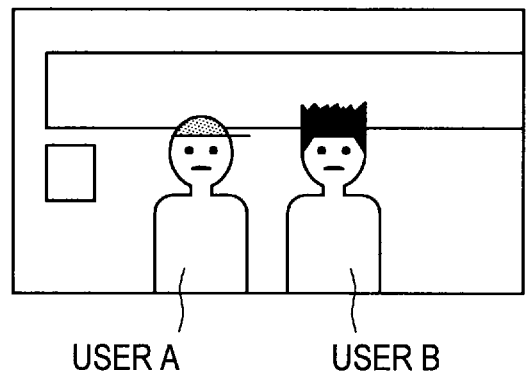
[FIG. 8A] to [FIG. 8D]
Figure 8B:
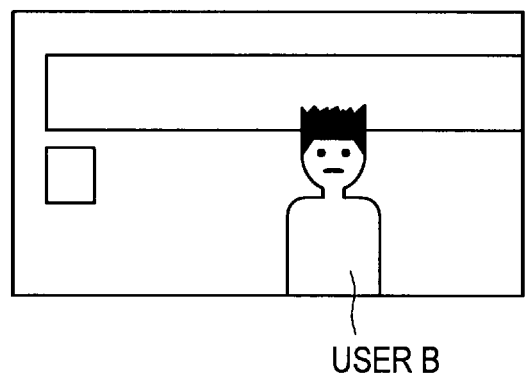
Figure 8C:
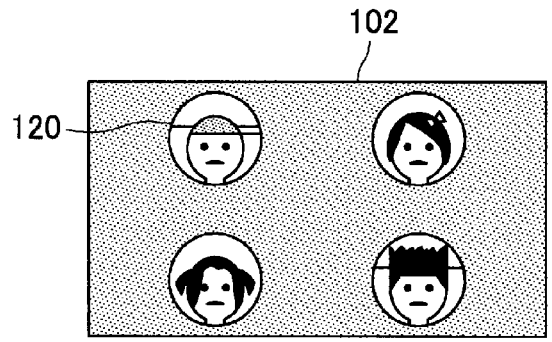
Figure 8D:
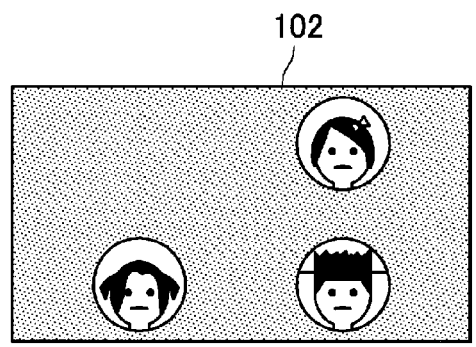
Figure 9A:
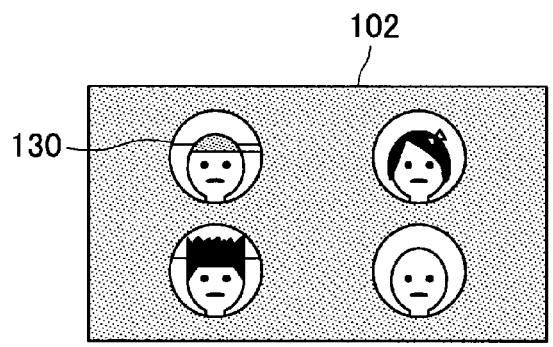
[FIG. 9A] to [FIG. 9D]
Figure 9B:
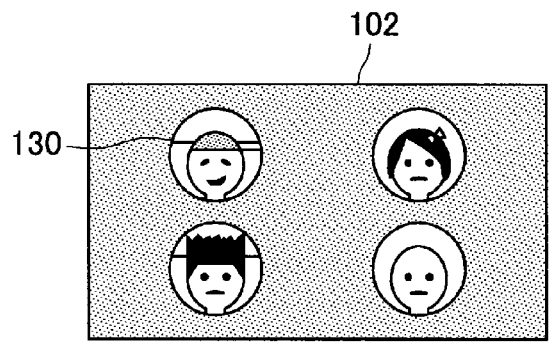
Figure 9C:
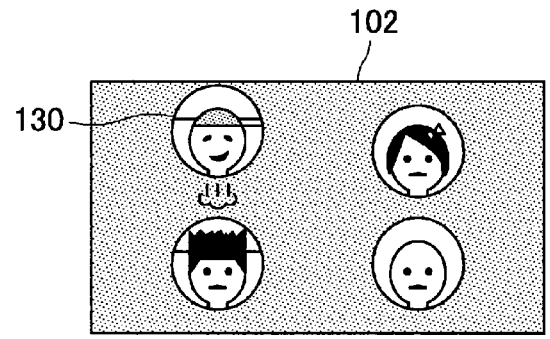
Figure 9D:
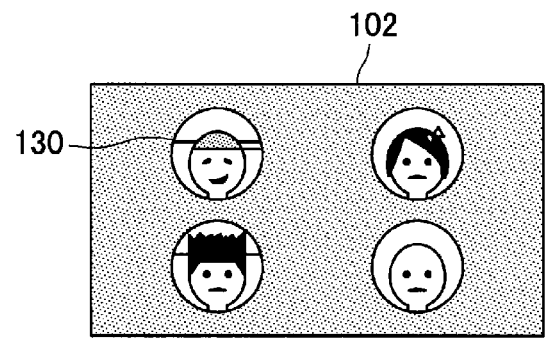

When the user A has gone away during network connection with the users C and D as shown in FIGS. 8A and 8B, a display image in which a user image 120 representing the user A of the information processing device 200 is deleted at the same time when the user A goes away is displayed on the display screen of the display device 102. Likewise, a display image in which a user image (not shown) representing the user A of the information processing device 200 is deleted at the same time when the user A goes away is displayed on the display screen of the display device 402 in the display system 400, although not shown.

According to the example 2, because the user image 120 representing the user A of the information processing device 200 is deleted at the same time when the user A goes away in the display image which is displayed on the display screen of the display device 402, a user of the other information processing device 500 can be surely aware that the user A of the information processing device 200 has gone away.

FIGS. 9A to 9D are explanatory views illustrating an example 3 of the disclosure. In the example 3, a case where an instruction for network connection with the users C and D is given by the user A, for example, in the information processing device 200 of FIG. 2, and the facial behavior of the user A has changed to smiling during network connection with the users C and D is described by way of illustration.

When the facial behavior of the user A has changed to smiling during network connection with the users C and D as shown in FIGS. 9A to 9D, a display image in which a user image 130 representing the user A whose facial behavior has changed to smiling is displayed like jumping is displayed on the display screen of the display device 102. Likewise, a display image in which a user image (not shown) representing the user A whose facial behavior has changed to smiling is displayed like jumping is displayed on the display screen of the display device 402 in the display system 400, although not shown.

According to the example 3, because the user image 130 representing the user A whose facial behavior has changed to smiling is displayed like jumping in the display image which is displayed on the display screen of the display device 402, a user of the other information processing device 500 can be surely aware that the facial behavior of the user A of the information processing device 200 has changed to smiling.

Figure 10A:
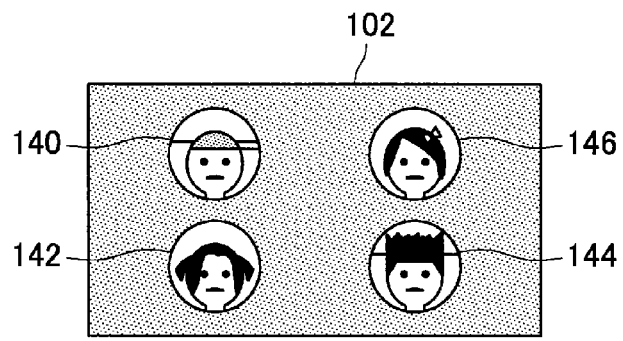
[FIG. 10A] to [FIG. 10B]
Figure 10B:
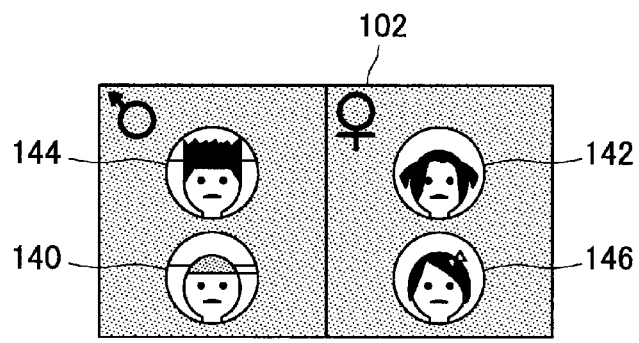

FIGS. 10A and 10B are explanatory views illustrating an example 4 of the disclosure. In the example 4, a case where an instruction for network connection with the users C and D is given by the user A, for example, in the information processing device 200 of FIG. 2, and a display image in which user images representing the users of the information processing device 200 and the other information processing device 500, 700 are displayed for each user, and a user image representing a user who has performed a behavior and a detail of the behavior are displayed in association with each other is displayed on the display screen of the display device 102 in FIG. 2 and the display screen in the display system 400 is described by way of illustration.

As shown in FIGS. 10A and 10B, the information processing device 200 recognizes the users A and B of the information processing device 200 and the users C and D of the other information processing device 500 by the above-described face recognition and further recognizes the gender of the users A and B of the information processing device 200 and the users C and D of the other information processing device 500, and then displays a display image in which a user image 140 representing the user A of the information processing device 200, a user image 144 representing the user B of the information processing device 200, a user image 142 representing the user C of the other information processing device 500, and a user image 146 representing the user D of the other information processing device 500 are displayed for each user and for each gender on the display screen of the display device 102. Likewise, though not shown, the other information processing device 500 recognizes the users A and B of the information processing device 200 and the users C and D of the other information processing device 500 by the above-described face recognition and further recognizes the gender of the users A and B of the information processing device 200 and the users C and D of the other information processing device 500, and then displays a display image in which a user image (not shown) representing the user A of the information processing device 200, a user image (not shown) representing the user B of the information processing device 200, a user image (not shown) representing the user C of the other information processing device 500, and a user image (not shown) representing the user D of the other information processing device 500 are displayed for each user and for each gender on the display screen of the display device 402.

According to the example 4, a user of the information processing device 200 and the other information processing device 500 can be surely aware of the gender of any user of the information processing device 200 and the other information processing device 500.

FIGS. 11A to 11E are explanatory views illustrating an example 5 of the disclosure. In the example 5, a case where an instruction for network connection with the users A and B is given by the user C, for example, in the other information processing device 500 of FIG. 2, and a content image 430 is newly displayed on the display screen in the display system 400 in FIG. 2 when a display image 420 which is generated by a display image generation unit (not shown) of the other information processing device 500 is being displayed on the display screen in the display system 400 is described by way of illustration.

Figure 11A:
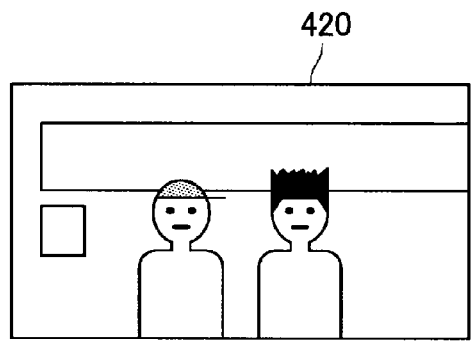
[FIG. 11A] to [FIG. 11E]
Figure 11B:
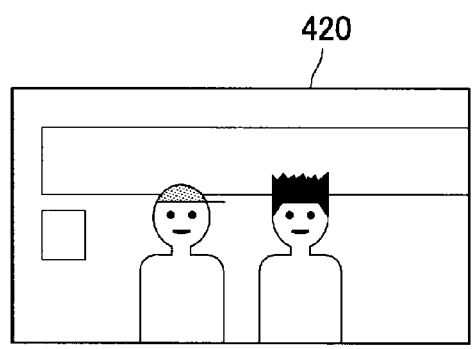
Figure 11C:
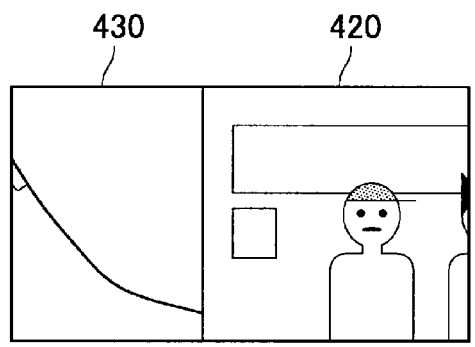
Figure 11D:
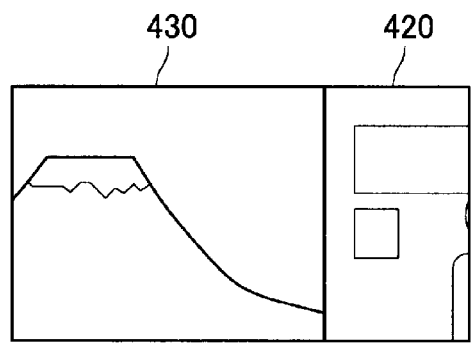
Figure 11E:
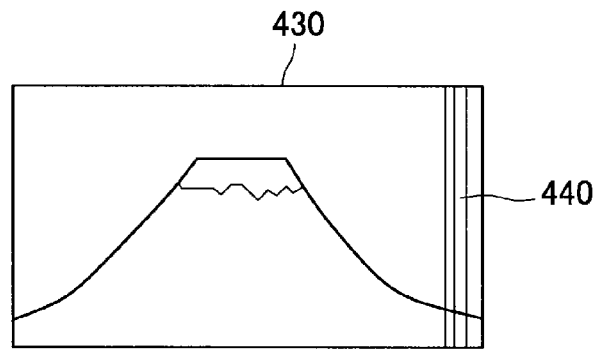

As shown in FIGS. 11A to 11E, in the case where the content image 430 is displayed on the display screen in the display system 400 when the display image 420 is being displayed thereon, the display image 420 is gradually shifted to the right to fade out of the screen, and the content image 430 is shifted from the left to the right to appear in the screen, thereby displaying the content image 430. Then, as shown in FIG. 11E, a display 440 indicating that it is under network connection is displayed on the display screen in the display system 400.

According to the example 5, a user of the other information processing device 500 can be surely aware that it is under network connection with the users A and B.

Figure 12A:
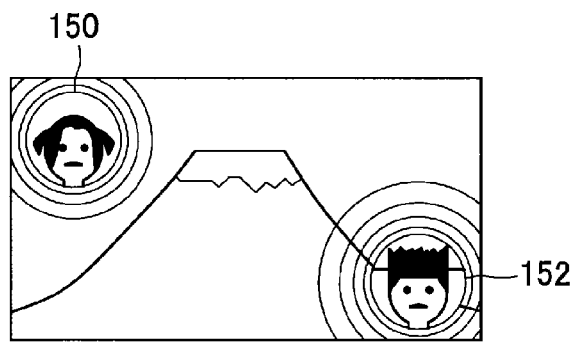
[FIG. 12A] to [FIG. 12B]
Figure 12B:
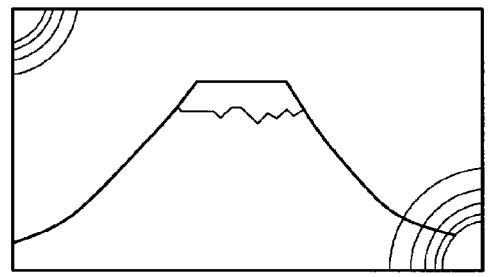

FIGS. 12A and 12B are explanatory views illustrating an example 6 of the disclosure. In the example 6, a case where an instruction for network connection with the user C is given by the user A, for example, in the information processing device 200 of FIG. 2, and a content image and a display image generated by the display image generation unit 206 are displayed in superposition on the display screen of the display device 102 is described by way of illustration.

As shown in FIGS. 12A and 12B, in the case where a content image and a display image generated by the display image generation unit 206 are displayed in superposition on the display screen of the display device 102, user images 150 and 152 are gradually moved offscreen. Then, as shown in FIG. 12B, when a user represented by the user image 150, 152 performs some act of behavior such as speech, wave-like behavior, for example, is made from the position corresponding to where the user image 150, 152 has been moved.

According to the example 6, a user of the information processing device 200 can view the entire content image and can be surely aware that it is under network connection with the user C.

FIGS. 13A to 13L are explanatory views illustrating an example 7 of the disclosure. In the example 7, a case where an instruction for network connection with the users A and B and the users C and D is given by the user E, for example, in the information processing device 700 of FIG. 2, and a display image in which user images representing the users of the information processing device 200 and the other information processing device 500, 700 are displayed for each user, and a user image representing a user who has performed a behavior and a detail of the behavior are displayed in association with each other is displayed on the display screen in the display system 600 of FIG. 2 is described by way of illustration.

Figure 13A:
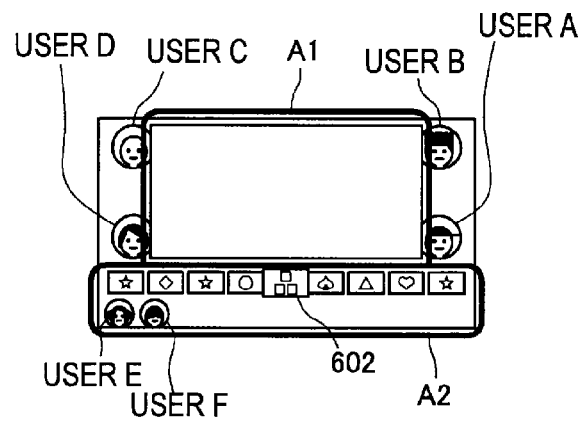
[FIG. 13A] to [FIG. 13L]
Figure 13B:
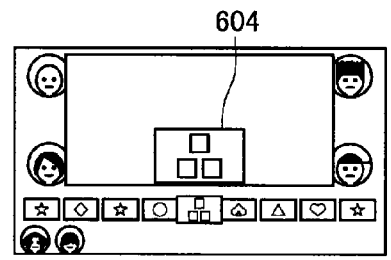
Figure 13C:
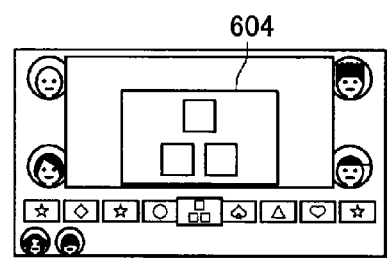
Figure 13D:
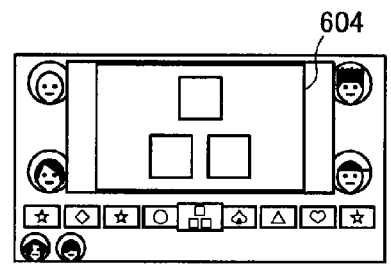
Figure 13E:
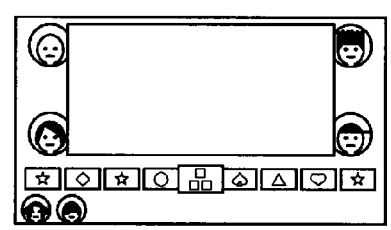
Figure 13F:
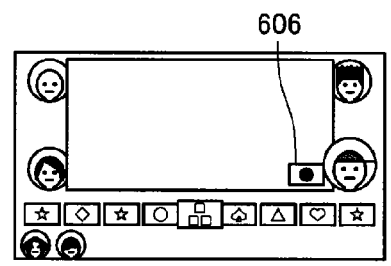
Figure 13G:
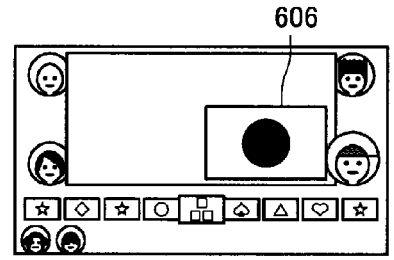
Figure 13H:
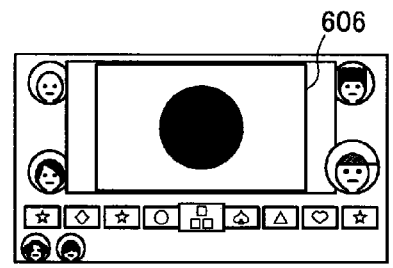
Figure 13I:
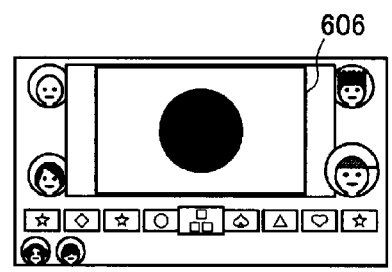
Figure 13J:
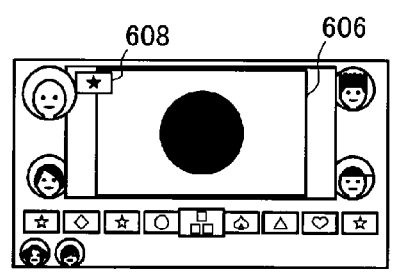
Figure 13K:
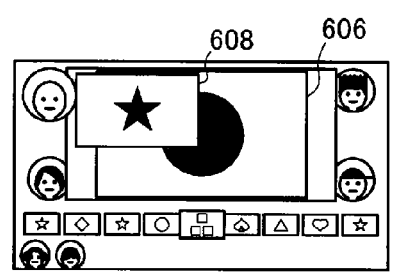
Figure 13L:
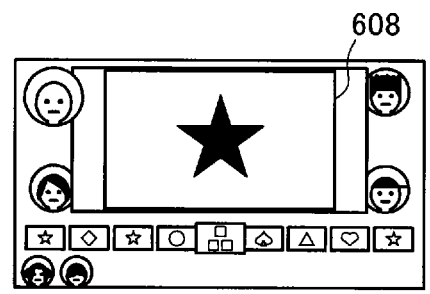

As shown in FIGS. 13A to 13L, on the display screen in the display system 600, a common content area A1 as an area where the users of the information processing device 200 and the other information processing device 500, 700 share contents, and a user-specific content area A2 as an area which represents contents of the users E and F of the other information processing device 700 are set. Then, when a content image 602 is selected as a content to be displayed in the common content area A1 by the user E, for example, a content image 604 corresponding to the content image 602 is displayed and gradually scaled up in a lower part as a position corresponding to the user E in the common content area A1 (FIGS. 13B to 13D). Further, when a content image (not shown) is selected as a content to be displayed in the common content area A1 by the user A, for example, a user image representing the user A is scaled up, and a content image 606 corresponding to the content image (not shown) which is selected by the user A is displayed and gradually scaled up in a lower right part as a position corresponding to the user A in the common content area A1 (FIGS. 13F to 13H). Further, when a content image (not shown) is selected as a content to be displayed in the common content area A1 by the user C, for example, a user image representing the user C is scaled up, and a content image 608 corresponding to the content image (not shown) which is selected by the user C is displayed and gradually scaled up in an upper left part as a position corresponding to the user C in the common content area A1 (FIGS. 13J to 13L). At this time, the content image 606 selected by the user A may fade out as shown in FIG. 13K.

According to the example 7, a user of the other information processing device 700 can be surely aware of the existence of any user of the information processing device 200 and the other information processing device 500, can feel a sense of realism, a sense of togetherness, a sense of closeness and the like as if communicating with them in the same place, and further can be surely aware of which user of the information processing device 200 and the other information processing device 500 has performed a behavior.

(6. Functional Configuration of Information Processing Device (Second Embodiment))

Figure 14:
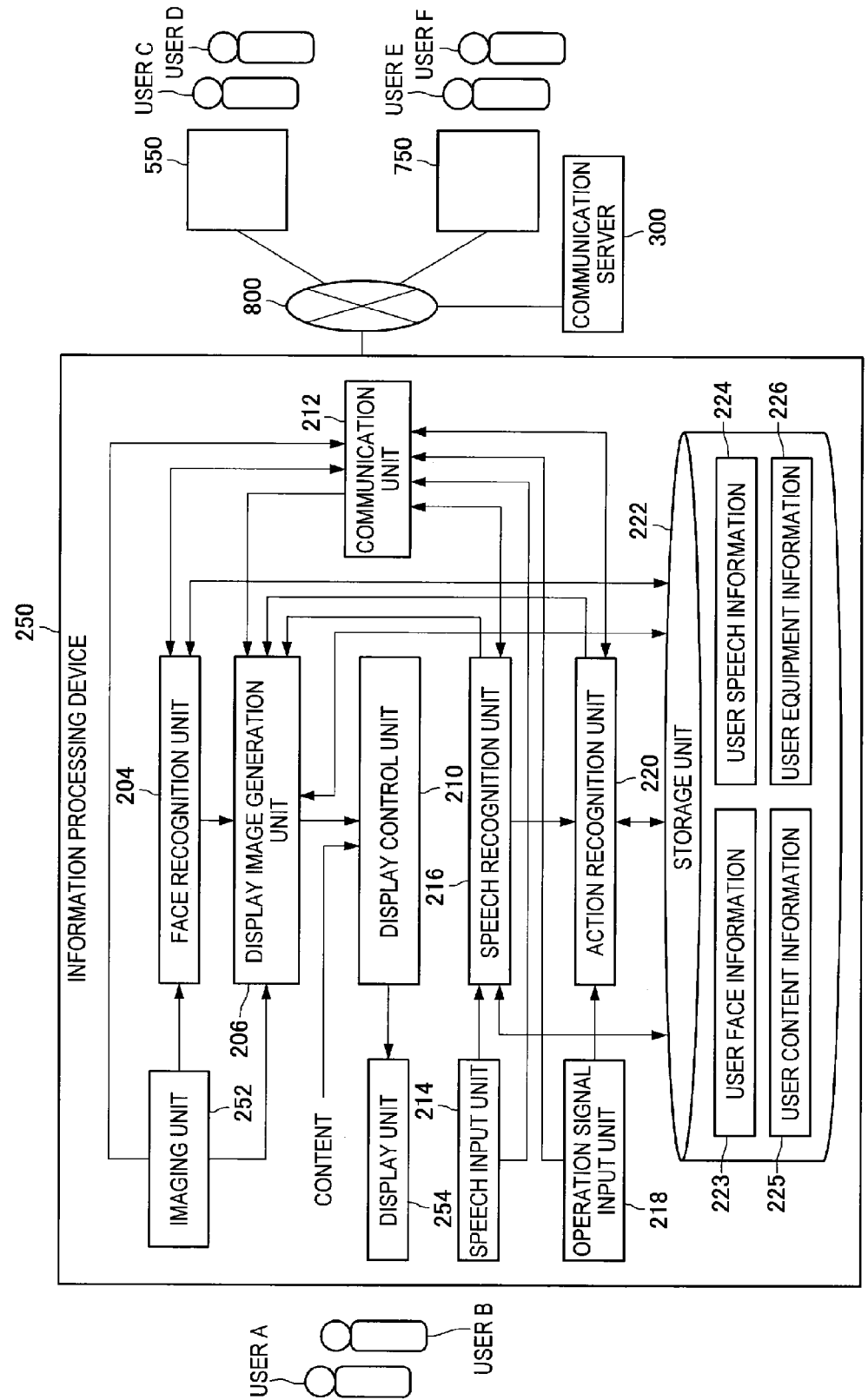
FIG. 14 is an explanatory view illustrating an example of a functional configuration of an information processing device according to a second embodiment of the disclosure.

A functional configuration of an information processing device according to a second embodiment of the disclosure is described. FIG. 14 is an explanatory view illustrating an example of a functional configuration of an information processing device according to the embodiment. An information processing device 250 as the information processing device according to the embodiment is different from the information processing device according to the first embodiment described above only in that it includes an imaging unit 252 and a display unit 254, and therefore explanation of redundant elements and functions is omitted, and explanation of different elements and functions is provided below.

Note that FIG. 14 shows users A and B, which are users of the information processing device 250, a communication network 800 to which the information processing device 250 can connect, a communication server 300 and other information processing devices 550 and 750 that can connect to the communication network 800, users C and D, which are users of the other information processing device 550, and users E and F, which are users of the other information processing device 750. The other information processing devices 550 and 750 have the same configuration as the information processing device 250, and detailed explanation thereof is omitted. The other information processing devices 550 and 750 are examples of a communication target device in the disclosure.

In FIG. 13, the information processing device 250 includes an imaging unit 252, a face recognition unit 204, a display image generation unit 206, a display unit 254, a display control unit 210, a communication unit 212, a speech input unit 214, a speech recognition unit 216, an operation signal input unit 218, an action recognition unit 220, and a storage unit 222, for example.

The imaging unit 252 can capture still images or moving images of the users A and B looking at the display screen of the display unit 254. Then, the imaging unit 252 can transmit a captured image generated by imaging to the communication unit 212, the face recognition unit 204 and the display image generation unit 206.

In the display unit 254, a display image in which user images representing the users of the information processing device 250 and the other information processing device 550, 750 are displayed for each user, and a user image representing a user who has performed a behavior and a detail of the behavior are displayed in association with each other can be displayed, for example.

According to the embodiment, the information processing device 250 executes the display process of FIG. 4 which is described earlier, thereby having the same effect as described earlier in the first embodiment. Further, according to the embodiment, the need for separately preparing the display system 100 shown in FIG. 2 can be eliminated, thereby allowing easier implementation.

Further, an object of the disclosure may be accomplished also by providing a storage medium, such as a non-transitory storage medium, storing program code of software that implements the functions of each of the embodiments described above to a system or a device, and reading and executing the program code stored in the storage medium by a computer (or CPU, MPU etc.) of the system or the device.

In this case, the program code which is read from the storage medium implements the functions of each of the embodiments described above, and the program code and the storage medium storing the program code constitute the disclosure.

Further, the storage medium for providing the program code may be floppy (registered trademark) disk, hard disk, magneto-optical disk, optical disk such as CDROM, CD-R, CD-RW, DVD-ROM, DVD-RAM, DVD-RW or DVD+RW, magnetic tape, nonvolatile memory card, ROM or the like, for example. Alternatively, the program code may be downloaded over a network.

Further, the disclosure is not limited to the case where a computer executes the read program code to thereby implement the functions of each of the embodiments described above, and the case where an OS (Operating System) or the like running on a computer performs a part or the whole of actual processing based on instructions of the program code to thereby implement the functions of each of the embodiments described above is also included.

Further, the case where the program code read from the storage medium is written into a memory in a function expansion board inserted to a computer or a function expansion unit connected to a computer, and then a CPU or the like in the expansion board or the expansion unit performs a part or the whole of actual processing for the expanded functions based on instructions of the program code to thereby implement the functions of each of the embodiments described above is also included.

It should be understood by those skilled in the art that various modifications, combinations, sub-combinations and alterations may occur depending on design requirements and other factors insofar as they are within the scope of the appended claims or the equivalents thereof.

For example, the communication server 300 may recognize users or facial behavior of users of the other information processing device 500, 700 from the captured image from the other information processing device 500, 700. Further, the communication server 300 may recognize a speaker among users of the other information processing device 500, 700 and contents of a speech by a speaker among the users from the speech from the other information processing device 500, 700. Furthermore, the communication server 300 may recognize actions of the users of the other information processing device 500, 700 from the operation signal from the other information processing device 500, 700.

Further, the information processing device 200 may transmit contents to the other information processing device 500, 700 to share the contents among users.

It should be understood by those skilled in the art that various modifications, combinations, sub-combinations and alterations may occur depending on design requirements and other factors insofar as they are within the scope of the appended claims or the equivalents thereof.

Reference Signs List
  100 Display system
  102 Display device
  104 Imaging device
  200 Information processing device
  202 Image input unit
  204 Face recognition unit
  206 Display image generation unit
  208 Output unit
  210 Display control unit
  212 Communication unit
  214 Speech input unit
  216 Speech recognition unit
  218 Operation signal input unit
  220 Action recognition unit
  222 Storage unit
  300 Communication server
  400, 600 Other communication systems
  500, 700 Other information processing devices
  800 Communication network

The invention claimed is:

1. An information processing apparatus comprising:
  a processing circuit configured to operate as (i) a user recognition unit to recognize a user in a captured image, (ii) a behavior recognition unit to recognize a behavior of a user, and (iii) a generation unit to generate user behavior information including information of the recognized user and the recognized behavior of the recognized user; and
  a communication interface to transmit the user behavior information to an external apparatus,
  the recognized behavior being one of a number of predetermined types of behavior, in which one predetermined type of behavior is speech of the user and the generated user behavior information associated therewith is an image for display on a display device which represents content of the speech along with the recognized user.

2. The apparatus of claim 1, wherein the user recognition unit recognizes the user in the captured image based on face detection.

3. The apparatus of claim 1, wherein the number of predetermined types of behavior includes an act of appearing in the captured image, a facial behavior, or an operation action.

4. The apparatus of claim 1 further comprising:
an image capture unit to capture the captured image.

5. An information processing apparatus comprising:
a communication interface to receive from an external apparatus user behavior information including information of a recognized user and a recognized behavior of the recognized user; and
a processing circuit to control display on a display screen of an image including a user image corresponding to the information of the recognized user and a visual representation corresponding to the information of the recognized behavior,
the recognized behavior being one of a number of predetermined types of behavior, in which one predetermined type of behavior is speech of the recognized user and the visual representation corresponding to the information thereof represents content of the speech such that the image displayed on the display screen includes the user image corresponding to the information of the recognized user and a visual representation of the content of the speech.

6. The apparatus of claim 5, wherein the predetermined items include an act of appearing in a captured image, a facial behavior, or an operation action by the recognized user.

7. The apparatus of claim 5, wherein the visual representation and the user image are displayed in association with each other.

8. A method of information processing comprising:
recognizing a user in a captured image;
recognizing a behavior of a user;
generating, by a processor, user behavior information including information of the recognized user and the recognized behavior of the recognized user; and
transmitting the user behavior information to an external apparatus,
the recognized behavior being one of a number of predetermined types of behavior, in which one predetermined type of behavior is speech of the user and the generated user behavior information associated therewith is an image for display on a display device which represents content of the speech along with the recognized user.

9. The method of claim 8, wherein the user is recognized in the captured image based on face detection.

10. The method of claim 8, wherein the number of predetermined types of behavior includes an act of appearing in the captured image, a facial behavior, or an operation action.

11. The method of claim 8 further comprising:
capturing the captured image.

12. A method of information processing comprising:
receiving from an external apparatus user behavior information including information of a recognized user and a recognized behavior of the recognized user; and
controlling, by a processor, display on a display screen of an image including a user image corresponding to the information of the recognized user and a visual representation corresponding to the information of the recognized behavior,
the recognized behavior being one of a number of predetermined types of behavior, in which one predetermined type of behavior is speech of the recognized user and the visual representation corresponding to the information thereof represents content of the speech such that the image displayed on the display screen includes the user image corresponding to the information of the recognized user and a visual representation of the content of the speech.

13. The method of claim 12, wherein the number of predetermined types of behavior include an act of appearing in a captured image, a facial behavior, or an operation action by the recognized user.

14. The method of claim 12, wherein the visual representation and the user image are displayed in association with each other.

15. A non-transitory recording medium recorded with a computer-readable program executable by a computer, the program comprising:
recognizing a user in a captured image;
recognizing a behavior of a user;
generating user behavior information including information of the recognized user and the recognized behavior of the recognized user; and
transmitting the user behavior information to an external apparatus,
the recognized behavior being one of a number of predetermined types of behavior, in which one predetermined type of behavior is speech of the user and the generated user behavior information associated therewith is an image for display on a display device which represents content of the speech along with the recognized user.

16. A non-transitory recording medium recorded with a computer-readable program executable by a computer, the program comprising:
receiving from an external apparatus user behavior information including information of a recognized user and a recognized behavior of the recognized user; and
controlling display on a display screen of an image including a user image corresponding to the information of the recognized user and a visual representation corresponding to the information of the recognized behavior,
the recognized behavior being one of a number of predetermined types of behavior, in which one predetermined type of behavior is speech of the recognized user and the visual representation corresponding to the information thereof represents content of the speech such that the image displayed on the display screen includes the user image corresponding to the information of the recognized user and a visual representation of the content of the speech.

17. The apparatus of claim 1, in which the number of predetermined types of behavior includes further includes an action requesting a display and in which the generated user behavior information associated therewith represents an image of an object arranged within a dialogue-type balloon associated with the user.

* * * * *